US012739903B2

(12) United States Patent
Kang et al.

(10) Patent No.: US 12,739,903 B2
(45) Date of Patent: Sep. 15, 2026

(54) APPARATUS AND METHOD FOR CONFIGURING RADIO LINK CONTROL LAYER PARAMETER FOR DIRECT COMMUNICATION IN WIRELESS COMMUNICATION SYSTEM

(71) Applicant: Samsung Electronics Co., Ltd., Gyeonggi-do (KR)

(72) Inventors: Hyunjeong Kang, Gyeonggi-do (KR); Anil Agiwal, Gyeonggi-do (KR); Sangkyu Baek, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/605,071

(22) Filed: Mar. 14, 2024

(65) Prior Publication Data

US 2024/0224354 A1 Jul. 4, 2024

Related U.S. Application Data

(63) Continuation of application No. 17/554,167, filed on Dec. 17, 2021, now Pat. No. 11,985,718, which is a (Continued)

(30) Foreign Application Priority Data

Mar. 28, 2019 (KR) ........................ 10-2019-0035871

(51) Int. Cl.
*H04W 76/14* (2018.01)
*H04W 24/10* (2009.01)
(Continued)

(52) U.S. Cl.
CPC ........... *H04W 76/14* (2018.02); *H04W 24/10* (2013.01); *H04W 72/23* (2023.01); *H04W 92/18* (2013.01)

(58) Field of Classification Search
CPC .. H04L 43/06; H04W 4/40–48; H04W 8/005; H04W 24/10; H04W 72/231;
(Continued)

(56) References Cited

U.S. PATENT DOCUMENTS 10,575,304 B2 2/2020 Faurie et al.
2017/0127405 A1 5/2017 Agiwal et al.
(Continued)

FOREIGN PATENT DOCUMENTS

CN 106105059 11/2016
CN 110225547 7/2022
(Continued)

OTHER PUBLICATIONS

3GPP TS 36.331 v.15.0.1 (Jan. 2018), Technical Specification, https://portal.3gpp.org/desktopmodules/Specifications/Specification Details.aspx?specificationId=2440, pp. 1-776 uploaded on Jan. 9, 2018 (Year: 2018).*
(Continued)

*Primary Examiner* — Thomas R Cairns
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method performed by a UE in a wireless communication system including receiving, from a base station associated with a first radio access technology
(Continued)

(RAT), a radio resource control (RRC) message including information related to a channel busy ratio (CBR) for a sidelink associated with a second RAT, which is different from the first RAT, measuring the CBR for the sidelink based on the information, and transmitting, to the base station, a measurement report message including the CBR for the sidelink associated with the second RAT.

4 Claims, 22 Drawing Sheets

Related U.S. Application Data continuation of application No. 16/834,420, filed on Mar. 30, 2020, now Pat. No. 11,206,704.

(51) Int. Cl.
*H04W 72/23* (2023.01)
*H04W 92/18* (2009.01)

(58) Field of Classification Search
CPC ..... H04W 72/51; H04W 72/52; H04W 72/54; H04W 72/542; H04W 76/14; H04W 76/27; H04W 84/18; H04W 88/06; H04W 92/18; H04W 72/12; H04W 72/23–232; H04W 72/512; H04W 2792/18; H04W 8/22; H04W 24/02; H04W 36/00; H04W 36/0083; H04W 36/0088; H04W 40/24; H04W 52/365; H04W 88/04; H04W 52/02; H04W 76/10; H04W 76/23
See application file for complete search history.

(56) References Cited

U.S. PATENT DOCUMENTS

2017/0181064 A1 6/2017 Lee
2017/0181206 A1 6/2017 Lee et al.
2017/0245245 A1 8/2017 Kim et al.
2018/0191551 A1 7/2018 Chun
2018/0242190 A1 8/2018 Khoryaev et al.
2018/0343692 A1 11/2018 Lee et al.
2019/0335532 A1 10/2019 Kim et al.
2020/0092692 A1 3/2020 Wang
2020/0100128 A1* 3/2020 Fan ........................ H04W 24/10
2020/0145867 A1* 5/2020 Tseng ..................... H04L 1/0026
2020/0275501 A1* 8/2020 Lee ................... H04W 72/1215
2021/0022131 A1 1/2021 Liu
2021/0185578 A1* 6/2021 Zhuo ..................... H04W 36/22
2021/0306885 A1* 9/2021 Hou ....................... H04W 24/10
2022/0174774 A1* 6/2022 Tseng ................ H04W 72/1263

FOREIGN PATENT DOCUMENTS

EP 3 120 469 1/2017
WO WO 2015/142132 9/2015
WO WO 2015/163625 10/2015
WO WO 2017/074131 5/2017
WO WO 2018/117774 6/2018
WO WO 2018/206992 11/2018

OTHER PUBLICATIONS

EP Notice of Allowance dated Dec. 6, 2024 issued in counterpart application No. 20779380.3-1215, 76 pages.
Chinese Office Action dated Mar. 29, 2024 issued in counterpart application No. 202080025528.8, 13 pages.
KR Decision of Rejection dated May 22, 2024 issued in counterpart application No. 10-2019-0035871, 9 pages.
Huawei, HiSilicon, "Discussion on L3 CP Related Aspects for NR Sidelink", R2-1814246, 3GPP TSG-RAN WG2 #103bis, Oct. 8-12, 2018, 5 pages.
International Search Report dated Jul. 2, 2020 issued in counterpart application No. PCT/KR2020/004298, 9 pages.
European Search Report dated Mar. 17, 2022 issued in counterpart application No. 20779380.3-1231, 7 pages.
Huawei, HiSilicon, "Radio Bearer Configuration and Management for NR Sidelink", R2-1816522, 3GPP TSG-RAN WG2 Meeting #104, Nov. 12-16, 2018, 5 pages.
Amongannan LG (Rapporteur), "Report of [103bis#38] SL Unicast/Groupcast (LG)", R2-1818496, 3GPP TSG-RAN WG2 #104, Nov. 12-16, 2018, 20 pages.
Korean Office Action dated Sep. 19, 2023 issued in counterpart application No. 10-2019-0035871, 9 pages.
Huawei, HiSilicon, "TP to TR 38.885 on QoS Support for NR V2X", R2-1902500, 3GPP TSG-RAN WG2 Meeting #105, Feb. 25-Mar. 1, 2019, 8 pages.
Intel Corporation, "Enhancements to UE Assistance and UE Sidelink Information", R2-1900882, 3GPP TSG-RAN WG2 Meeting #105, Feb. 25-Mar. 1, 2019, 3 pages.
European Search Report dated Dec. 19, 2023 Issued in counterpart application No. 20779380.3-1215, 7 pages.
Zhao, "A Scheduling Request Sending, Received Method, Terminal and Network Side Device," English Machine Translation, Clarivate Analytics, 2023, pp. 1-20 (Year: 2023).
Chinese Office Action dated Mar. 29, 2024 issued in counterpart application No. 202080025528.8, 15 pages.

* cited by examiner

Figure 7:
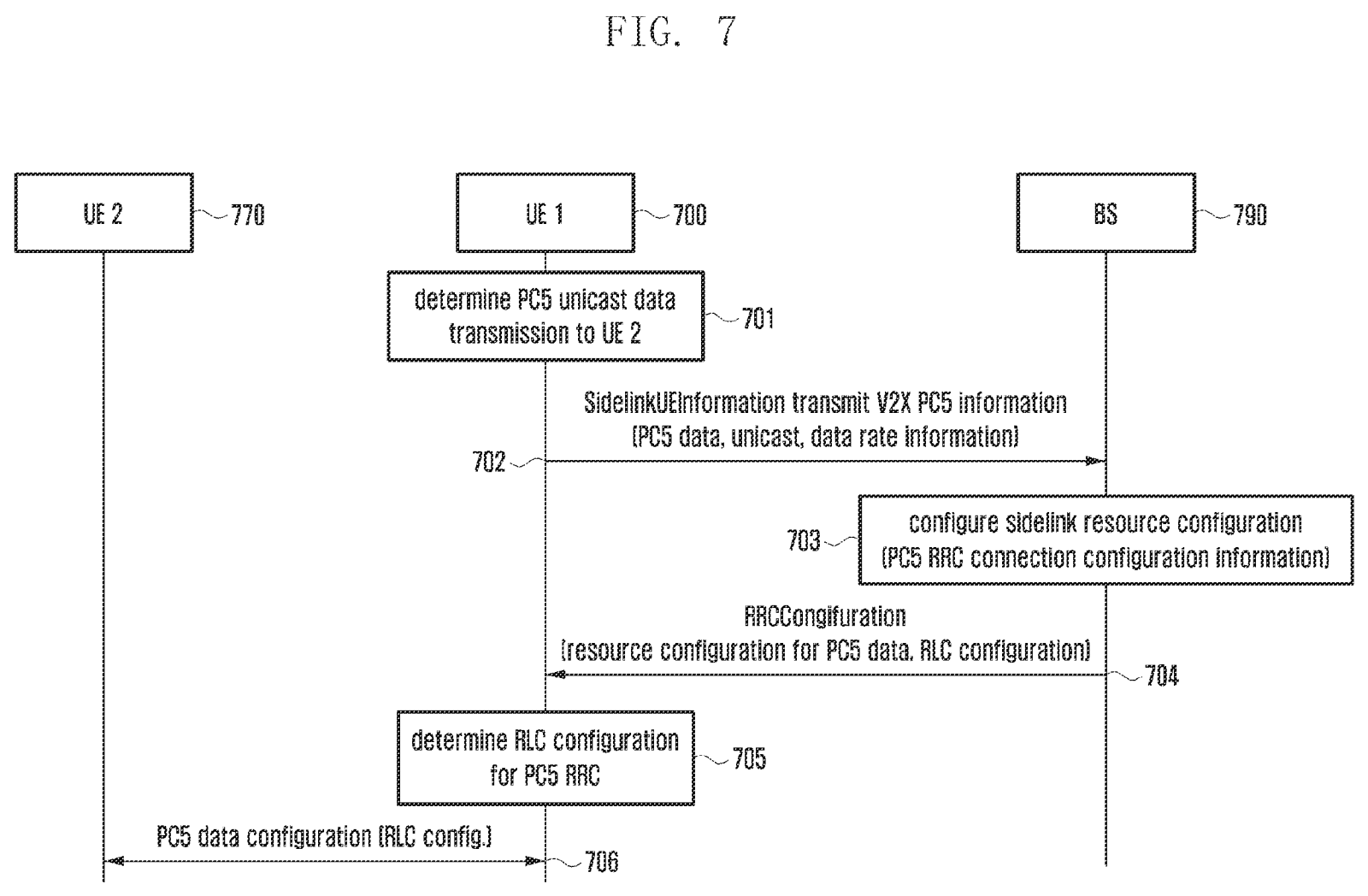

701~ determine PC5 unicast data transmission to UE 2

702~ SidelinkUEInformation transmit V2X PC5 information (PC5 data, unicast, data rate information)

703~ configure sidelink resource configuration (PC5 RRC connection configuration information)

704~ RRCConfiguration (resource configuration for PC5 data, RLC configuration)

705~ determine RLC configuration for PC5 RRC

706~ PC5 data configuration (RLC config.)

FIG. 8A 801 receive SL measurement and report configuration

Figure 8A:
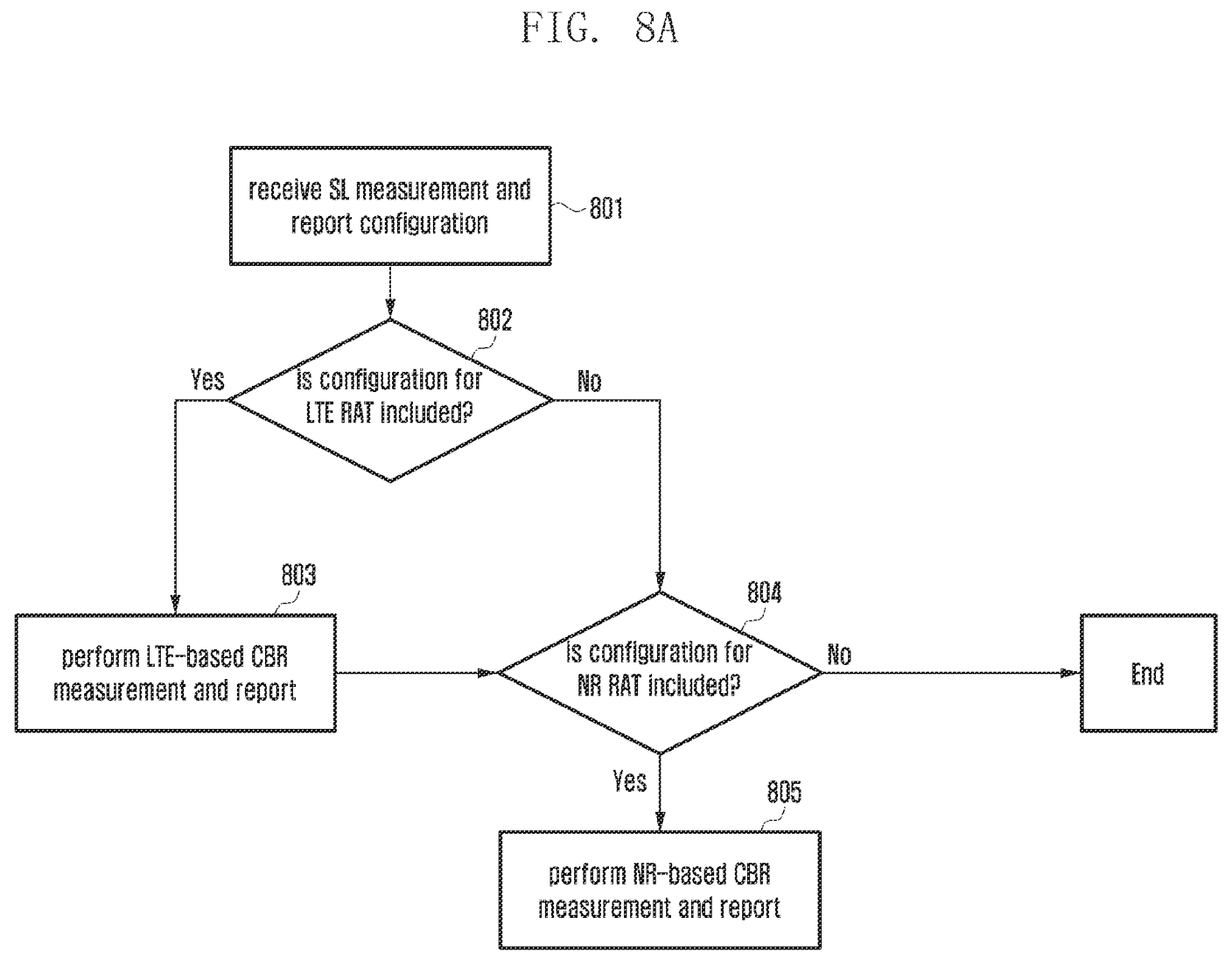

802 Is configuration for LTE RAT included?

Yes

No 803 perform LTE-based CBR measurement and report

804 Is configuration for NR RAT included?

No

Yes 805 perform NR-based CBR measurement and report

End

APPARATUS AND METHOD FOR CONFIGURING RADIO LINK CONTROL LAYER PARAMETER FOR DIRECT COMMUNICATION IN WIRELESS COMMUNICATION SYSTEM

CROSS-REFERENCE TO RELATED APPLICATION(S)

This application is a Continuation Application of U.S. patent application Ser. No. 17/554,167, filed on Dec. 17, 2021, which is a Continuation Application of U.S. patent application Ser. No. 16/834,420, filed on Mar. 30, 2020, now U.S. Pat. No. 11,206,704, issued on Dec. 21, 2021, and is based on and claims priority under 35 U.S.C. § 119 to Korean Patent Application No. 10-2019-0035871, filed on Mar. 28, 2019, in the Korean Intellectual Property Office, the entire disclosure of each of which is incorporated herein by reference.

BACKGROUND

1. Field

The disclosure relates generally to a wireless communication system, and more particularly, to an apparatus and a method for supporting a configuration of a sidelink radio link control (RLC) layer parameter required for data transmission by a direct communication bearer in a wireless communication system.

2. Description of Related Art

To meet the demand for wireless data traffic having increased since the deployment of fourth generation (4G) communication systems, efforts have been made to develop an improved fifth generation (5G) or pre-5G communication system, also referred to as a beyond 4G network" or a post long term evolution (LTE) system.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, development for system network improvement in 5G communication systems is under way based on advanced small cells, cloud radio access networks (RANs), ultra-dense networks, device-to-device (D2D) communication, wireless backhaul, moving network, cooperative communication, and coordinated multi-points (CoMP), reception-end interference cancellation, for example.

In the 5G system, hybrid frequency shift keying (FSK), quadrature amplitude modulation (QAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system is considering supports for more various services as compared to the conventional 4G system. For example, the most representative service may include an ultrawide band mobile communication service (enhanced mobile broad band (eMBB)), an ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service that is a new service under consideration in the 5G system in contrast to the existing 4G system requires ultrahigh reliability, such as a packet error rate of about 10% and low latency, such as about 0.5 milliseconds (msec), as compared to the other services. To meet these strict conditions, the URLLC service may need to apply a shorter transmission time interval (TTI) than the eMBB service, and various operating schemes employing the same are now under consideration.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, and machine type communication (MTC) have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence of 5G with IoT.

In a 5G system, wireless interface schemes for providing services meeting various levels of quality of service (QoS) are being researched. For example, a direct communication scheme for a vehicle-to-everything (V2X) user equipment (UE) has been proposed. V2X refers to all types of communication schemes that can be applied to road vehicles, and various additional services, beyond an initial safety application, have become possible through convergence with recently developed wireless communication technology. However, there is a need in the art to further decrease a communication time, increase reliability, and more efficiently support direct communication between UEs.

SUMMARY

Aspects of the disclosure are to address at least the above-mentioned problems and/or disadvantages and to provide at least the advantages described below.

Accordingly, an aspect of the disclosure is to provide an apparatus and a method for supporting a vehicle communication service and data transmission that achieve a required high-reliability and low-latency value by providing a method of performing communication through a direct communication scheme between UEs in a vehicle communication system.

Another aspect of the disclosure is to provide a method of supporting a vehicle communication service that requires various levels of quality of service (QoS) through direct communication between UEs and a method of configuring an RLC function parameter used for direct communication between UEs in a vehicle communication system, thereby achieving a required high-speed, high-reliability, and low-latency value.

In accordance with an aspect of the disclosure, a method performed by a UE in a wireless communication system includes receiving, from a base station associated with a first radio access technology (RAT), a radio resource control (RRC) message including information related to a channel busy ratio (CBR) for a sidelink associated with a second RAT, which is different from the first RAT, measuring the CBR for the sidelink based on the information, and transmitting, to the base station, a measurement report message including the CBR for the sidelink associated with the second RAT.

In accordance with another aspect of the disclosure, a method performed by a base station associated with a first RAT in a wireless communication system includes transmitting, to a UE, an RRC message including information related to a CBR for a sidelink associated with a second RAT, which is different from the first RAT, and receiving, from the UE, a measurement report message including the CBR for the sidelink associated with the second RAT, wherein the CBR for the sidelink is measured based on the information.

In accordance with another aspect of the disclosure, a UE in a wireless communication system includes a transceiver, and a controller configured to receive, from a base station associated with a first RAT, an RRC message including information related to a CBR for a sidelink associated with a second RAT, which is different from the first RAT, measure the CBR for the sidelink based on the information, and transmit, to the base station, a measurement report message including the CBR for the sidelink associated with the second RAT.

In accordance with another aspect of the disclosure, a base station associated with a first RAT in a wireless communication system includes a transceiver, and a controller configured to transmit, to a UE, an RRC message including information related to a CBR for a sidelink associated with a second RAT, which is different from the first RAT, and receive, from the UE, a measurement report message including the CBR for the sidelink associated with the second RAT, wherein the CBR for the sidelink is measured based on the information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates a signal procedure for operating an RLC function configuration parameter to be applied to sidelink data according to an embodiment;

FIG. 8A illustrates a method of a UE for measuring and reporting congestion of sidelink resources according to an embodiment;

DETAILED DESCRIPTION

Figure 1:
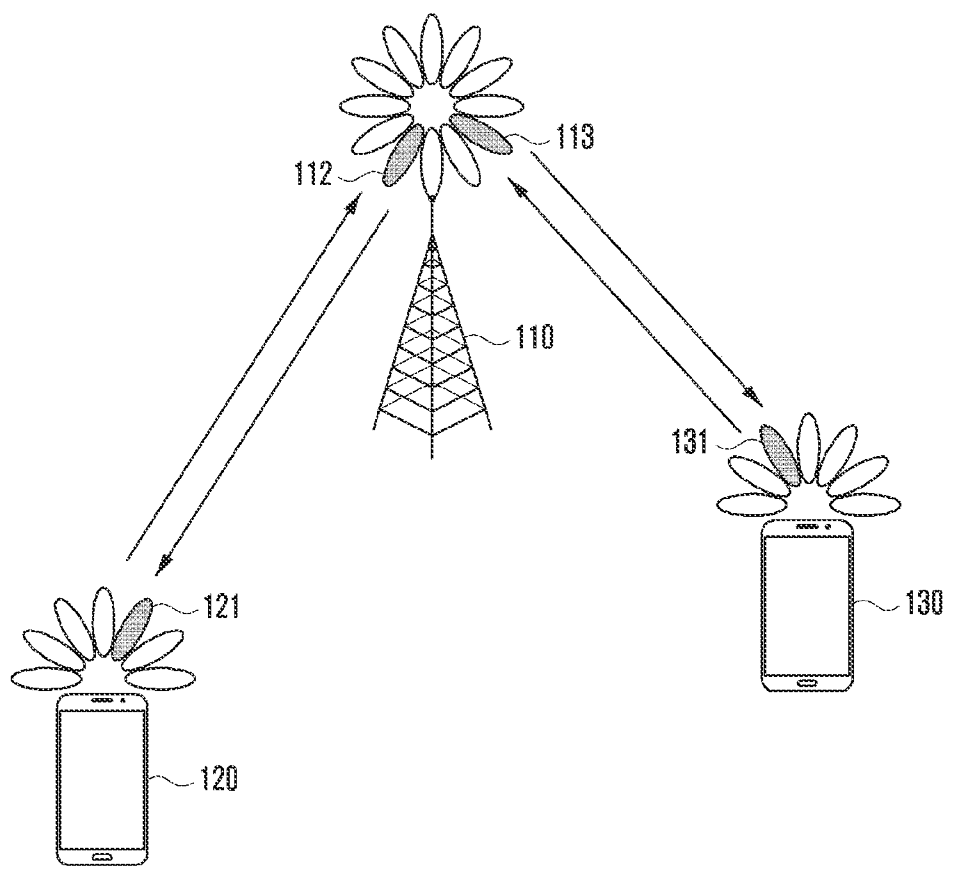
FIG. 1 illustrates a wireless communication system according to an embodiment.

Hereinafter, embodiments of the disclosure may be described with reference to accompanying drawings. Accordingly, those of ordinary skill in the art will recognize that modifications, equivalents, and/or alternatives on the embodiments described herein can be variously made without departing from the scope and spirit of the disclosure. With regard to description of drawings, similar components may be marked by similar reference numerals. Descriptions of well-known functions and/or configurations will be omitted for the sake of clarity and conciseness.

The terms used in the disclosure are only used to describe specific embodiments and are not intended to limit the disclosure. A singular expression may include a plural expression unless they are different in context. Unless defined otherwise, all terms used herein, including technical and scientific terms, have the same meaning as those commonly understood by a person skilled in the art to which the disclosure pertains. Such terms as those defined in a generally used dictionary may be interpreted to have the same meanings as the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, embodiments will be described based on hardware. However, the embodiments include a technology that uses both hardware and software and thus, may also include software.

The disclosure relates to an apparatus and a method for configuring an RLC function parameter to support a V2X service through a direct communication protocol between UEs in a wireless communication system. Specifically, the disclosure describes technology for satisfying a QoS level required for various V2X services based on a method of a UE for configuring an RLC parameter required for supporting high-speed data transmission and high reliability, which are needed for sidelink direct communication between V2X UEs in a wireless communication system.

Terms referring to a signal used in the following description, terms referring to a channel, terms referring to control information, terms referring to network entities, and terms referring to elements of a device are used only for convenience of description. Accordingly, the disclosure is not limited to those terms, and other terms having the same technical meanings may be used.

The disclosure describes embodiments using terms from communication standards, such as the $3^{rd}$-generation partnership project (3GPP)), but this is only an example. Embodiments herein may be modified and applied to other communication systems.

A method of operating a UE in a wireless communication system may include determining data rate information required by a V2X application, informing a BS of the required data rate information, acquiring an RLC function configuration parameter corresponding to the data rate information from the BS, informing another UE of the acquired RLC function configuration parameter, and performing direct communication-based data transmission and reception based on the acquired RLC function configuration parameter.

A UE apparatus in a wireless communication system may include a transceiver and at least one processor functionally connected to the transceiver. The at least one processor may determine data rate information of a V2X application through which the UE transmits and receives data in a direct communication mode, inform the BS of required data rate information, and receive an RLC function configuration parameter corresponding to the required data rate information from the BS. When the UE acquires the RLC function configuration parameter corresponding to the data rate information, the at least one processor may inform another UE of the RLC function configuration parameter.

FIG. 1 illustrates a wireless communication system according to an embodiment.

FIG. 1 illustrates a BS 110, UE #1 120, and UE #2 130 as some of the nodes using a radio channel in a wireless communication system. Although FIG. 1 illustrates only one BS, another BS that is the same as or similar to the BS 110 may be further included. Although FIG. 1 illustrates only two UEs, another UE that is the same as or similar to UE #1 120 and UE #2 130 may be further included.

The BS 110 is a network infrastructure element that provides radio access to the UEs 120 and 130. The BS 110 has coverage defined in a predetermined geographical area based on the range within which a signal can be transmitted and received. The BS 110 may be referred to as an "access point (AP)", "eNodeB (eNB)", "$5^{th}$-generation (5G) node", "5G nodeB (NB)", "wireless point", or "transmission/reception point (TRP)", or using another term having a technical meaning equivalent thereto.

Each of UE #1 120 and UE #2 130 is used by a user and communicates with the BS 110 through a radio channel. Depending on the circumstances, at least one of UE #1 120 and UE #2 130 may be operated without user involvement. That is, at least one of UEs #1 120 and UE #2 130 performs MTC and may not be carried by the user. Each of UE #1 120 and UE #2 130 may be referred to as a "user equipment", "mobile station", "subscriber station", "remote terminal", "wireless terminal", or "user device", or using another term having the same meaning, as well as "terminal".

The BS 110, UE #1 120, and UE #2 130 may transmit and receive a wireless signal in a subband of 6 gigahertz (GHz) and mmWave bands (for example, 28 GHz, 30 GHz, 38 GHz, and 60 GHz). In order to increase channel gain, the BS 110, the UE #1 120, and the UE #2 130 may perform beamforming, which may include transmission beamforming and reception beamforming. That is, the BS 110, the UE #1 120, and the UE #2 130 may assign directivity to a transmission signal or a reception signal. To this end, the BS 110 and the UEs 120 and 130 may select serving beams 112, 113, 121, and 131 through a beam search procedure or beam management procedure. After the serving beams 112, 113, 121, and 131 are selected, communication may be performed through resources having a quasi-co-located (QCL) relationship with resources through which the serving beams 112, 113, 121, and 131 are transmitted.

If the large-scale characteristics of a channel for transmitting symbols through a first antenna port can be inferred from a channel for transmitting symbols through a second antenna port, the first antenna port and the second antenna port may be evaluated to have a QCL relationship therebetween. For example, the large-scale characteristics may include at least one of delay spread, Doppler spread, Doppler shift, average gain, average delay, and spatial receiver parameters.

Figure 2:
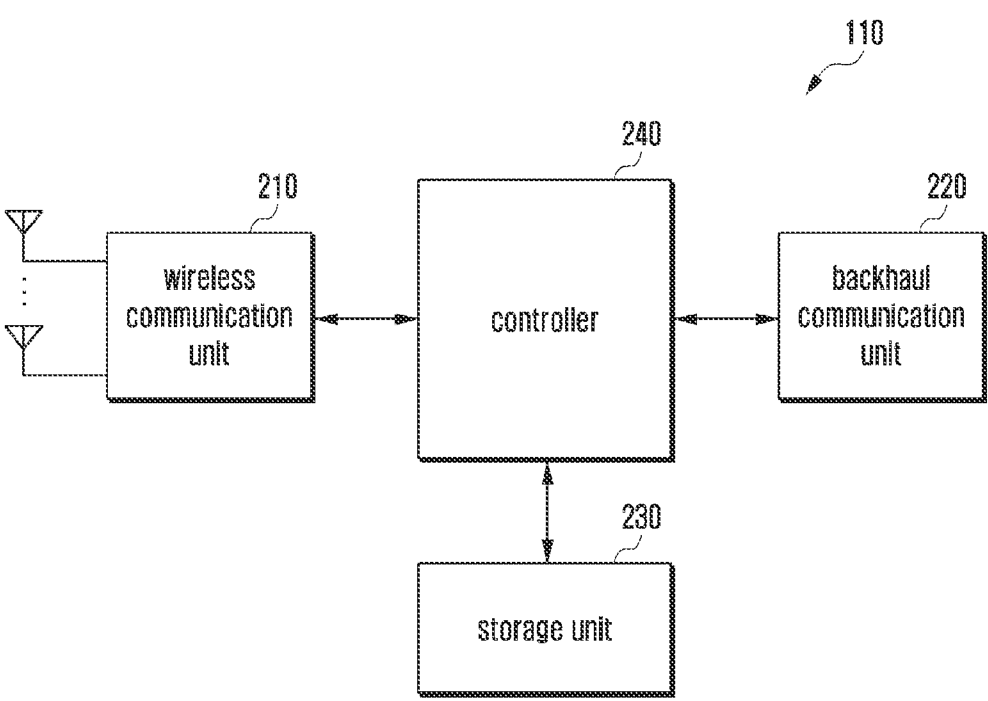
FIG. 2 illustrates the configuration of a BS in a wireless communication system according to an embodiment.

FIG. 2 illustrates the configuration of a BS in a wireless communication system according to an embodiment.

The configuration illustrated in FIG. 2 may be the configuration of the BS 110. The term "... unit" or the ending of a word, such as "... or" or "... er", may indicate a unit of processing at least one function or operation, and may be embodied by hardware, software, or a combination of hardware and software.

Referring to FIG. 2, the BS includes a wireless communication unit 210, a backhaul communication unit 220, a storage unit 230, and a controller 240.

The wireless communication unit 210 performs functions for transmitting and receiving a signal through a radio channel. For example, the wireless communication unit 210 performs a function of conversion between a baseband signal and a bitstream according to the physical-layer standard of the system. In data transmission, the wireless communication unit 210 may encode and modulate a transmission bitstream to generate complex symbols. In data reception, the wireless communication unit 210 reconstructs a reception bitstream by demodulating and decoding a baseband signal.

In addition, the wireless communication unit 210 up-converts a baseband signal into a radio-frequency (RF) band signal which it transmits through an antenna, and down-converts an RF band signal received through an antenna into a baseband signal. To this end, the wireless communication unit 210 may include a transmission filter, a reception filter, an amplifier, a mixer, an oscillator, a digital-to-analog convertor (DAC), and an analog-to-digital convertor (ADC), for example. The wireless communication unit 210 may include a plurality of transmission/reception paths and at least one antenna array including a plurality of antenna elements.

On the hardware side, the wireless communication unit 210 may include a digital unit and an analog unit. The analog unit may include a plurality of sub-units according to operating power, operating frequency, and the like. The digital unit may be implemented by at least one processor, such as a digital signal processor (DSP).

The wireless communication unit 210 transmits and receives a signal as described above. Accordingly, all or part of the wireless communication unit 210 may be referred to as a "transmitter", a "receiver", or a "transceiver". In the following description, transmission and reception performed through a radio channel may include the above-described processing by the wireless communication unit 210.

The backhaul communication unit 220 provides an interface for communicating with other nodes within the network. That is, the backhaul communication unit 220 converts a bitstream transmitted from the BS to another access node, another BS, a higher node, or a core network, into a physical signal, and converts a physical signal received from the node into a bitstream.

The storage unit 230 may store data such as a basic program for the operation of the BS, an application, and configuration information. The storage unit 230 may include at least one of a volatile memory and nonvolatile memory. The storage unit 230 provides stored data in response to a request from the controller 240.

The controller 240 may control the overall operation of the BS. For example, the controller 240 transmits and receives a signal through the wireless communication unit 210 or the backhaul communication unit 220. The controller 240 records and reads data in the storage unit 230. The controller 240 may perform the functions of a protocol stack required for communication standards. According to another implementation, the protocol stack may be included in the wireless communication unit 210. To this end, the controller 240 may include at least one processor.

The controller 240 may transmit RRC configuration information to the UEs 120 and 130. The controller 240 may transmit sidelink configuration information to the UEs 120 and 130. For example, the controller 240 may control the BS to perform operations according to embodiments described below.

Figure 3:
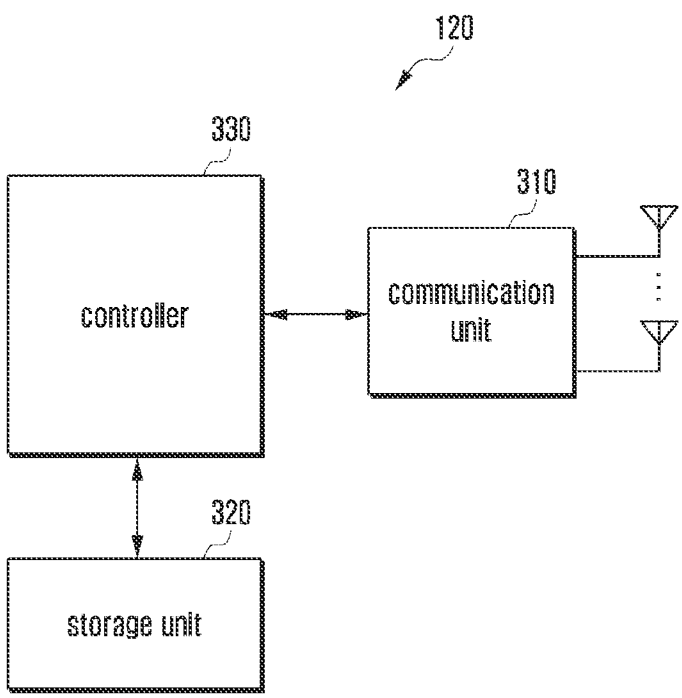
FIG. 3 illustrates the configuration of a UE in a wireless communication system according to an embodiment.

FIG. 3 illustrates the configuration of a UE in a wireless communication system according to an embodiment.

The configuration illustrated in FIG. 3 may be the configuration of UE #1 120 or UE #2 130. Referring to FIG. 3, the UE includes a communication unit 310, a storage unit 320, and a controller 330.

The communication unit 310 performs functions for transmitting and receiving a signal through a radio channel. For example, the communication unit 310 performs a function of conversion between a baseband signal and a bitstream according to a physical-layer standard of the system. In data transmission, the communication unit 310 encodes and modulates a transmission bitstream to generate complex symbols. In data reception, the communication unit 310 reconstructs a reception bitstream by demodulating and decoding a baseband signal. The communication unit 310 up-converts a baseband signal to an RF band signal, transmits the RF band signal through an antenna, and then down-converts the RF band signal received through the antenna to the baseband signal. The communication unit 310 may include a transmission filter, a reception filter, an amplifier, a mixer, an oscillator, a DAC, and an ADC.

The communication unit 310 may include a plurality of transmission/reception paths. The communication unit 310 may include at least one antenna array including a plurality of antenna elements. On the hardware side, the communication unit 310 may include a digital circuit and an analog circuit, such as a radio-frequency integrated circuit (RFIC). The digital circuit and the analog circuit may be implemented as a single package. The communication unit 310 may include a plurality of RF chains and may perform beamforming.

The communication unit 310 may include different communication modules for processing signals in different frequency bands. The communication unit 310 may include a plurality of communication modules for supporting a plurality of different radio access technologies. For example, the different radio access technologies may include Bluetooth™ low energy (BLE), wireless fidelity (Wi-Fi), Wi-Fi gigabyte, and a cellular network, such as LTE. Different frequency bands may include a super-high-frequency (SHF) (for example, 2.5 GHz, 3.5 GHz, and 5 GHz) band and an mm wave (for example, 60 GHz) band.

The communication unit 310 transmits and receives a signal, and thus, may be referred to as a "transmitter", a "receiver", or a "transceiver". Transmission and reception performed through a wireless channel may indicate that the above-described processing is performed by the communication unit 310.

The storage unit 320 stores data such as a basic program, an application, and configuration information for the operation of the UE. The storage unit 320 may include at least one of a volatile memory and nonvolatile memory. The storage unit 320 provides stored data in response to a request from the controller 330.

The controller 330 controls the overall operation of the UE. For example, the controller 330 transmits and receives a signal through the communication unit 310. The controller 330 records and reads data in the storage unit 320. The controller 330 may perform the functions of a protocol stack required by the communication standard. To this end, the controller 330 may include at least one processor or microprocessor or may be a part of the processor. The part of the communication unit 310 or the controller 330 may be referred to as a communications processor (CP).

The controller 330 may perform a process of determining a data transmission requirement of a V2X application for performing sidelink direct communication between the UEs 120 and 130 and another UE, informing the BS 110 of required data transmission information, receiving an RLC function configuration parameter corresponding to required data transmission information from the BS, providing RLC function configuration parameter information to another UE, and processing data to be transmitted to another UE according to the RLC function configuration parameter information. For example, the controller 330 may control the UE to perform operations according to embodiments described below.

Figure 4A:
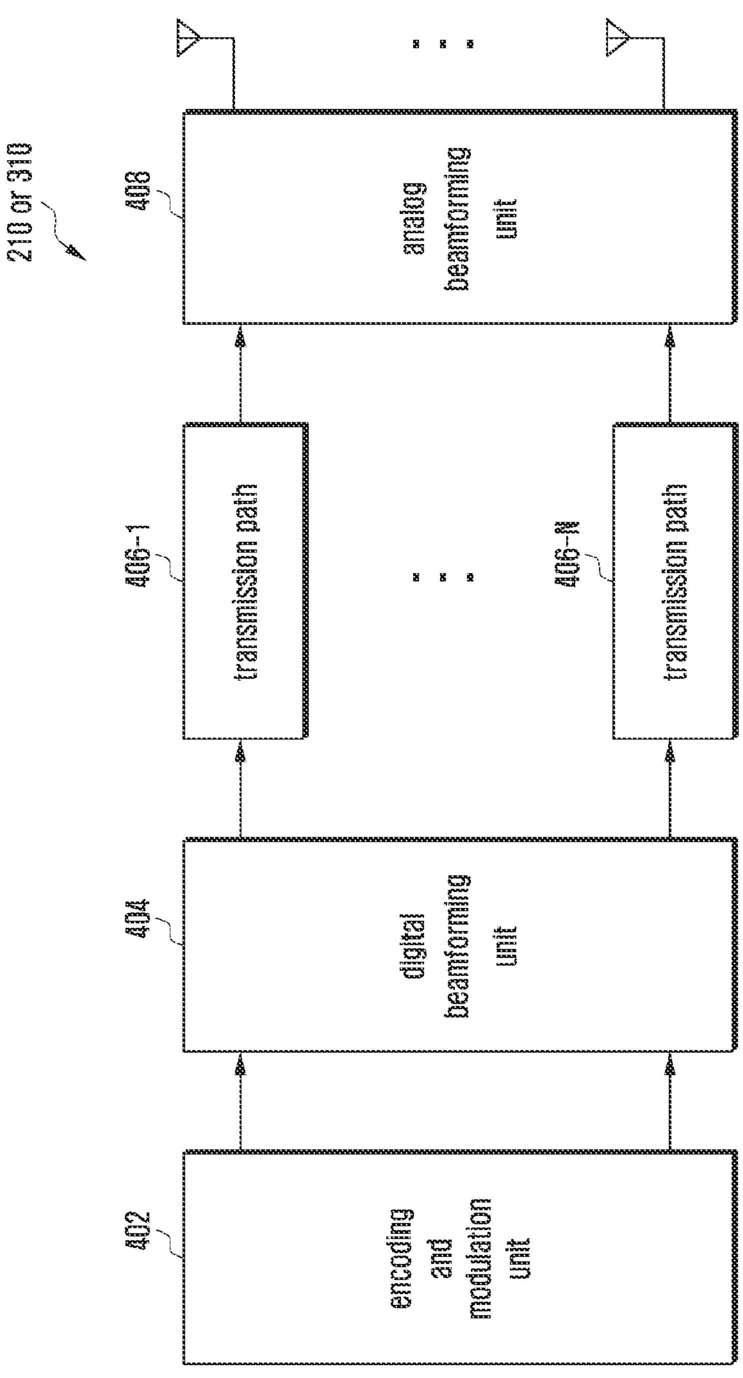
FIG. 4A illustrates the configuration of a communication unit in a wireless communication system according to an embodiment.

FIG. 4A illustrates the configuration of a communication unit in a wireless communication system according to an embodiment.

Referring to FIG. 4A, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding, for which at least one of a low-density parity check (LDPC) code, a convolution code, and a polar code may be used. The encoding and modulation unit 402 generates modulation symbols by performing constellation mapping.

The digital beamforming unit 404 performs beamforming on a digital signal (for example, modulation symbols). To this end, the digital beamforming unit 404 multiplies beamforming weights by modulation symbols. The beamforming weight values may be used for changing the size and phase of the signal and may be referred to as a "precoding matrix" or a "precoder". The digital beamforming unit 404 outputs digitally beamformed modulation symbols through the plurality of transmission paths 406-1 to 406-N. According to a MIMO transmission scheme, the modulation symbols may be multiplexed, or the same modulation symbols may be provided to the plurality of transmission paths 406-1 to 406-N.

The plurality of transmission paths 406-1 to 406-N converts the digitally beamformed digital signals into analog signals. To this end, each of the plurality of transmission paths 406-1 to 406-N may include an inverse fast Fourier transform (IFFT) calculator, a cyclic prefix (CP) inserter, a DAC, and an up-converter. The CP inserter is for an orthogonal frequency-division multiplexing (OFDM) scheme and may be omitted when another physical layer scheme (for example, a filter bank multi-carrier (FBMC) scheme) is applied. That is, the plurality of transmission paths 406-1 to 406-N provides independent signal-processing processes for a plurality of streams generated through the digital beamforming. However, depending on the implementation, some of the elements of the plurality of transmission paths 406-1 to 406-N may be used in common.

The analog beamforming unit 408 performs beamforming on an analog signal. To this end, the digital beamforming unit 404 multiplies beamforming weights by analog signals. The beamforming weights are used to change the size and phase of the signal. More specifically, the analog beamforming unit 408 may be configured as illustrated in FIG. 4B or 4C according to the connection structure between the plurality of transmission paths 406-1 to 406-N and the antennas.

Figure 4B:
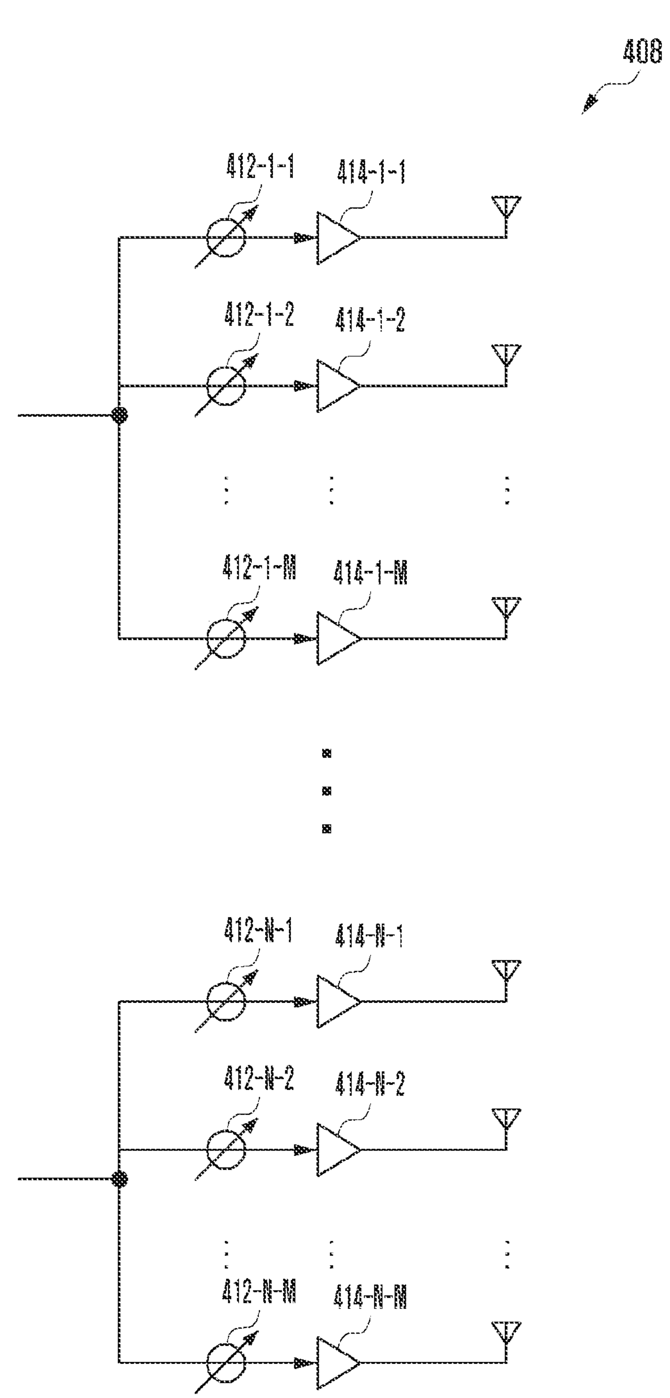
FIG. 4B illustrates an example in which an analog beamforming unit of a communication unit uses an independent antenna array for each transmission path in a wireless communication system according to an embodiment.

FIG. 4B illustrates the configuration of a communication unit in a wireless communication system according to an embodiment. Referring to FIG. 4B, signals input into the analog beamforming unit 408 may be transmitted through the antennas via phase/size conversion and amplification operation. The signals in respective paths are transmitted through different antenna arrays (or sets). In processing of signals input through a first path, the signals are converted into signal sequences having the same or different phase/size by phase/size conversion units 412-1-1 to 412-1-M, amplified by amplifiers 414-1-1 to 414-1-M, and transmitted through antennas.

Figure 4C:
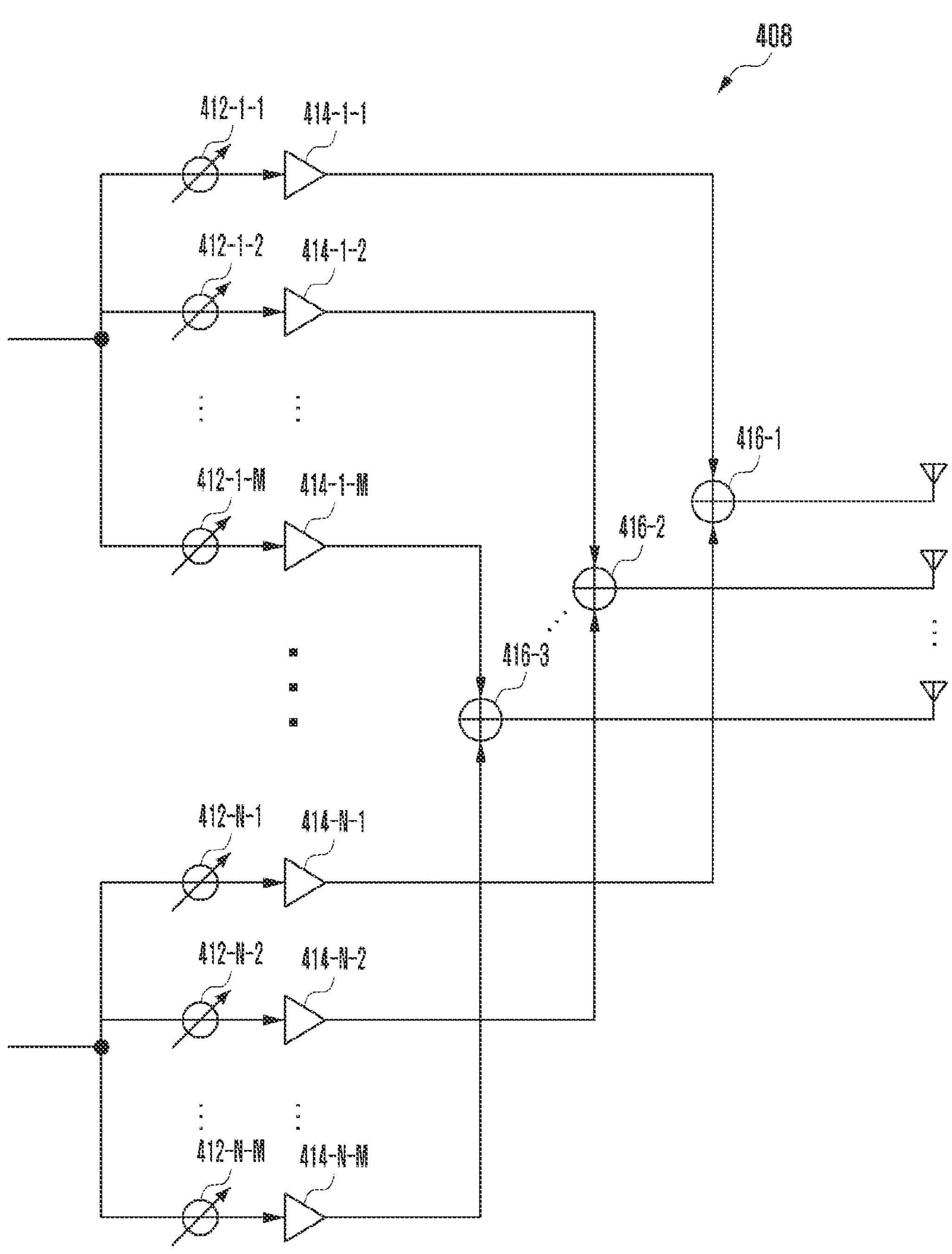
FIG. 4C illustrates an example in which an analog beamforming unit of a communication unit shares one antenna array for transmission paths in a wireless communication system according to an embodiment.

FIG. 4C illustrates the configuration of a communication unit in a wireless communication system according to an embodiment.

Referring to FIG. 4C, the signals input into the analog beamforming unit 408 are transmitted through the antennas via phase/size conversion and amplification operation. The signals in respective paths are transmitted through the same antenna array. In the processing of signals input through a first path, the signals are converted into signal sequences having the same or different phases/sizes by the phase/size conversion units 412-1-1 to 412-1-M, and are amplified by the amplifiers 414-1-1 to 414-1-M. The amplified signals to be transmitted through one antenna are summed by summing units 416-1 to 416-M based on antenna elements and are then transmitted through antennas.

FIG. 4B illustrates an example in which an independent antenna array is used for each transmission path, and FIG. 4C illustrates an example in which transmission paths share one antenna array. However, some transmission paths may use independent antenna arrays and the remaining transmission paths may share one antenna array. Also, a structure that may adaptively vary depending on the situation may be used by applying a switchable structure between transmission paths and antenna arrays.

A V2X service may be divided into a basic safety service and an advanced service. The basic safety service may correspond to detailed services such as a vehicle notification ((cooperative awareness messages (CAM) or basic safety message (BSM)) service, a left-turn notification service, a forward collision warning service, an approaching emergency vehicle notification service, a forward obstacle warning service, and an intersection signal information service, and may transmit and receive V2X information through a broadcast, unicast, or groupcast transmission scheme.

The advanced service has more stringent QoS requirements compared to the basic safety service, and needs a scheme of transmitting and receiving V2X information through unicast and broadcast transmission schemes, rather than the broadcast transmission scheme, in order to transmit and receive V2X information within a specific vehicle group or between two vehicles. The advanced service may correspond to detailed services such as a platooning service, an autonomous driving service, a remote driving service, and an extended sensor-based V2X service.

For the V2X service, the UE may perform the V2X service in an ng-RAN (gNB) connected to a 5G core network or an E-UTRAN (ng-eNB) connected to a 5G core network through the ng-RAN or the E-UTRAN. When the BS (ng-RAN or ng-eNB) is connected to an evolved packet core (EPC) network, the V2X service may be performed through the BS. When the BS is connected to an evolved packet core (EPC) network, the V2X service may be performed through the BS. A V2X wireless interface communication scheme that can be used for direct communication between UEs may be at least one of unicast, groupcast, and broadcast schemes, and a method of managing and configuring a wireless communication parameter suitable for QoS requirements of the V2X service should be provided when V2X transmission/reception is performed in each of the communication schemes.

A system for performing direct communication between UEs based on LTE wireless communication is defined such that a transmission UE selects and operates parameters that it requires for transmission. In the case of LTE wireless communication, a V2X service message for basic safety is transmitted between UEs through a direct communication scheme. QoS requirements of the basic safety V2X service are not strict, and even if there is a variety of basic safety services, the variety of QoS requirements between services is low, and differences between services are minimal. Accordingly, even in a mode in which the BS schedules radio resources to be used for direct communication between UEs based on LTE wireless communication, the BS simply schedules radio resources without any need to acquire detailed QoS requirement information of the V2X service, and the UE manages and configures parameters.

Advanced V2X services have various QoS requirements, and the QoS level of each V2X service may greatly vary. A specific advanced V2X service can be executed only when radio resources and radio parameters for direct communication are configured so as to satisfy the strict QoS requirements of the service. Accordingly, a system based on direct communication between UEs for supporting the advanced V2X service should provide a better method of guaranteeing QoS than the conventional system.

Figure 5A:
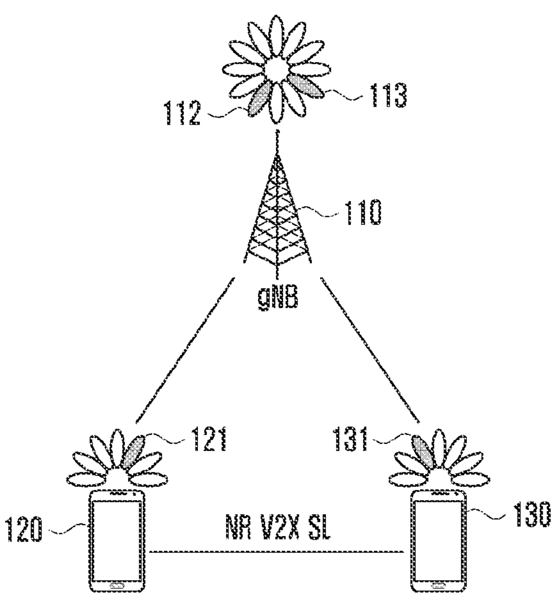
FIG. 5A illustrates direct communication between UEs through a sidelink radio access technology (RAT) according to a first embodiment.

FIG. 5A illustrates direct communication between UEs through a sidelink RAT according to a first embodiment. In FIG. 5A, UEs in the gNB coverage perform direct communication. Resource allocation configuration parameter information of a sidelink radio bearer to be used for transmitting and receiving a V2X packet based on unicast, broadcast, or groupcast between UEs may be transmitted to the UEs 120 and 130 through a system information message or an RRC-dedicated message of the gNB 110, or may be configured in advance in the UEs 120 and 130. The UEs 120 and 130 performing direct communication by NR V2X SL may transmit data rate information required by the V2X service packet to the gNB 110 and acquire sidelink resource allocation and/or RLC function configuration parameter information from the gNB 110. The sidelink RLC function configuration parameter information may be transferred to another UE.

Figure 5B:
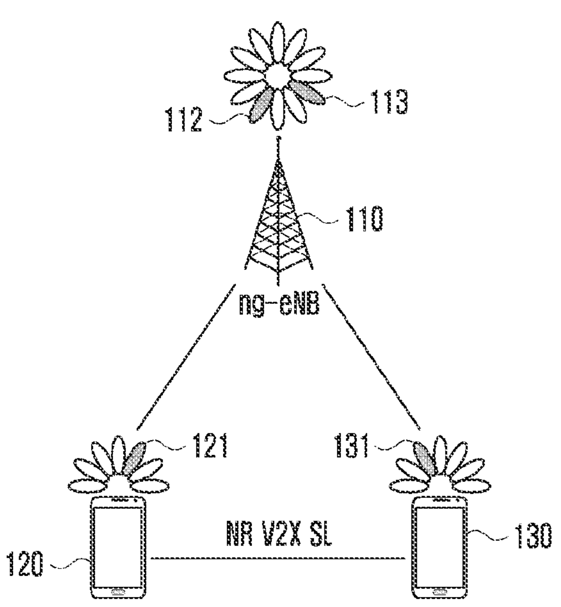
FIG. 5B illustrates direct communication between UEs through a sidelink RAT according to a second embodiment.

FIG. 5B illustrates direct communication between UEs through a sidelink RAT according to a second embodiment. In FIG. 5B, the UEs 120 and 130 in the ng-eNB coverage perform direct communication. Resource allocation configuration parameter information of a sidelink radio bearer to be used for transmitting and receiving a V2X packet based on unicast, broadcast, or groupcast between UEs may be transmitted to the UEs 120 and 130 through a system information message or an RRC dedicated message of the ng-eNB 110 or configured in advance in the UEs 120 and 130. The UEs 120 and 130 performing direct communication by NR V2X SL may transmit data rate information required by the V2X service packet to the ng-eNB 110 and acquire sidelink resource allocation and/or RLC function configuration parameter information from the ng-eNB 110. The sidelink RLC function configuration parameter information may be transferred to another UE.

Figure 5C:
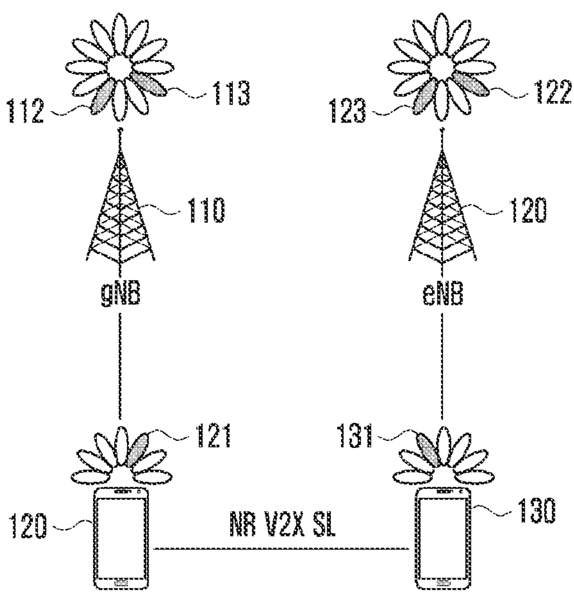
FIG. 5C illustrates direct communication between UEs through a sidelink RAT according to a third embodiment.

FIG. 5C illustrates direct communication between UEs through a sidelink RAT according to a third embodiment. In FIG. 5C, the UE 120 in the gNB coverage and the UE 130 in the eNB coverage perform direct communication. Resource allocation configuration parameter information of a sidelink radio bearer to be used for transmitting and receiving a V2X packet based on unicast, broadcast, or groupcast between UEs may be transmitted to the UEs 120 and 130 through a system information message or an RRC dedicated message of the gNB 110, or may be configured in advance in the UEs 120 and 130. The UEs 120 and 130 performing direct communication by NR V2X SL may transmit data rate information required by the V2X service packet to the gNB 110 and acquire sidelink resource allocation and/or RLC function configuration parameter information from the gNB 110. The sidelink RLC function configuration parameter information may be transferred to another UE.

Figure 5D:
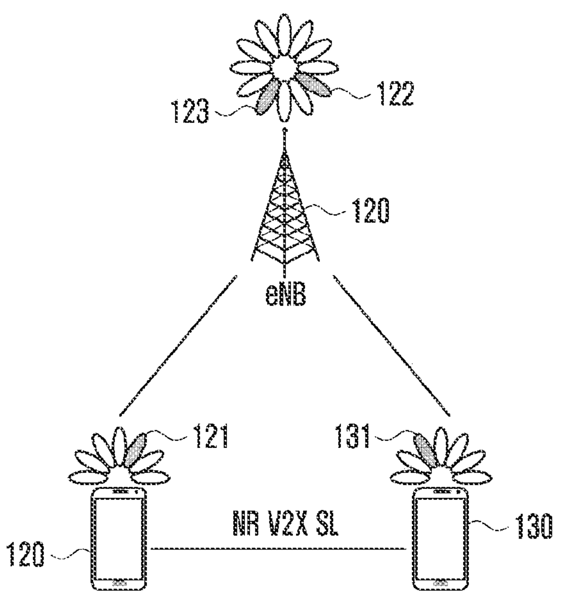
FIG. 5D illustrates direct communication between UEs through a sidelink RAT according to a fourth embodiment.

FIG. 5D illustrates direct communication between UEs through a sidelink RAT according to a fourth embodiment. In FIG. 5D, the UEs 120 and 130 in the eNB coverage perform direct communication. Resource allocation configuration parameter information of a sidelink radio bearer to be used for transmitting and receiving a V2X packet based on unicast, broadcast, or groupcast between UEs may be transmitted to the UEs 120 and 130 through a system information message or an RRC dedicated message of the eNB 110, or may be configured in advance in the UEs 120 and 130. The UEs 120 and 130 performing direct communication by NR V2X SL may transmit data rate information required by the V2X service packet to the eNB 110 and acquire sidelink resource allocation and/or RLC function configuration parameter information from the eNB 110. The sidelink RLC function configuration parameter information may be transferred to another UE.

The sidelink RLC function configuration parameter for performing direct communication between UEs may be used to perform PC5 RRC signaling transmission/reception in the unicast manner, transmit/receive a V2X message in the unicast manner, transmit/receive a V2X message in the broadcast manner, and transmit/receive a V2X message in the groupcast manner.

Sidelink direct communication may be used to perform PC5 RRC signaling transmission/reception used for configuring and managing a unicast connection between UEs and to transmit/receive V2X data that can be exchanged between UEs in the unicast manner, groupcast manner, and broadcast manner. Configuration information required for performing PC5 RRC signaling transmission/reception may include a function configuration parameter for each layer, such as packet data convergence protocol (PDCP), radio link control (RLC), medium access control (MAC), or physical (PHY). Configuration information required for transmitting/receiving V2X data may include a function configuration parameter for each layer, such as PDCP, RLC, MAC, or PHY. The disclosure describes a method of operating the sequence number (SN) size and an ARQ configuration parameter, among RLC layer functions applied to PC5 RRC signaling and V2X data. The RLC layer function configuration parameter may be configured according to at least one of a determination method by a UE implementation, a preconfigured method, a method configured by the BS (RRC-dedicated signaling or V2X SIB signaling), and a method configured by the UE (PC5 RRC-dedicated signaling, PC5 MIB, or PC5 SIB).

Figure 6A:
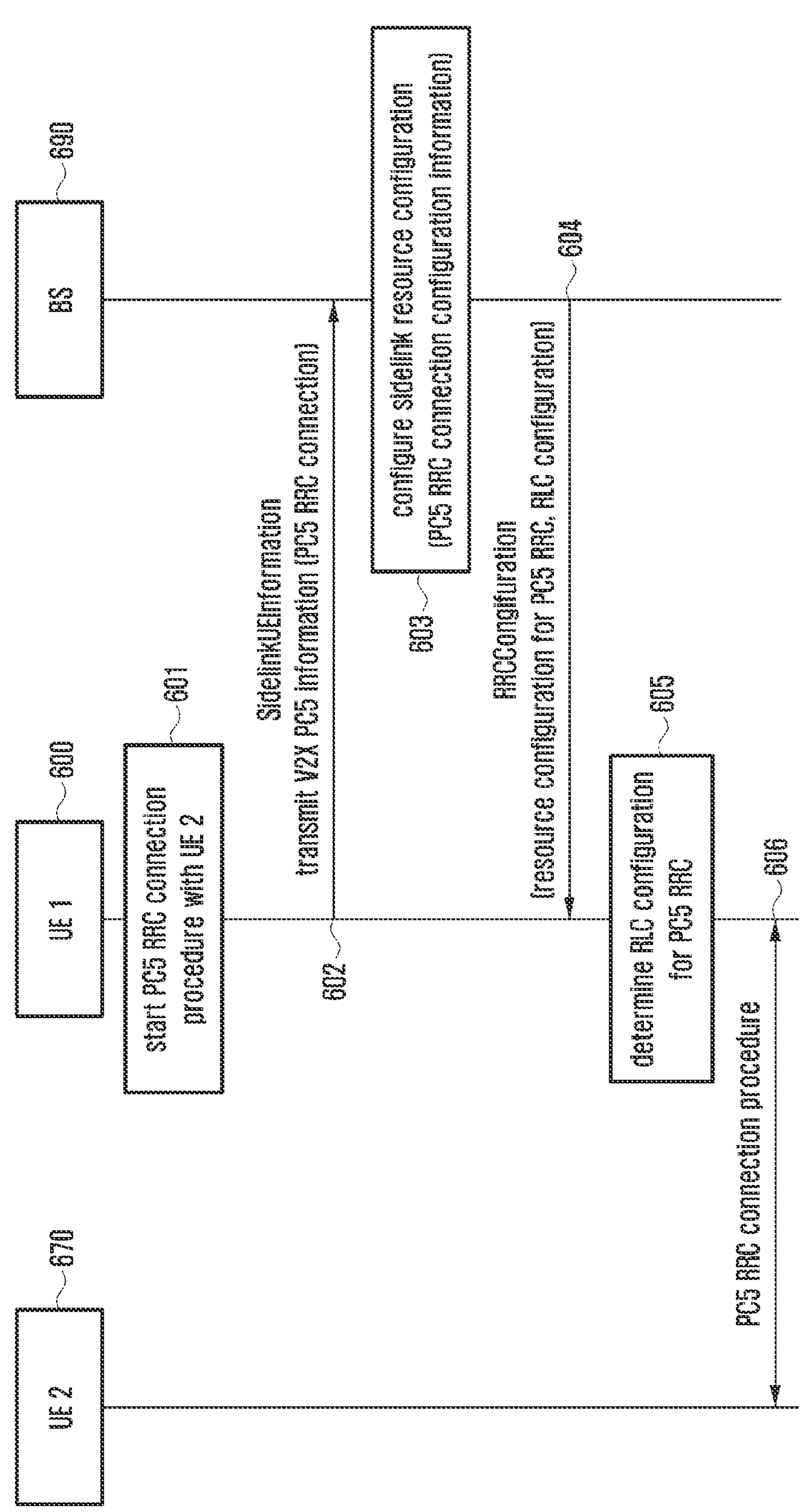
FIG. 6A illustrates a method by which a BS configures an RLC function configuration parameter required for configuring a PC5 RRC connection between UEs according to an embodiment.

FIG. 6A illustrates a signal procedure for operating an RLC function configuration parameter to be applied to sidelink RRC according to an embodiment. FIG. 6A illustrates a method by which the BS configures an RLC function configuration parameter required for configuring a PC5 RRC connection between UEs and informs the UE of the same. The BS may indicate the configuration of the RLC function configuration parameter required for configuring the PC5 RRC connection and/or update the parameter to a new value.

Referring to FIG. 6A, UE #1 600 may determine that a PC5 RRC connection for a sidelink unicast connection with UE #2 670 is needed and start a PC5 RRC configuration procedure in step 601. UE #1 600 may transmit a SidelinkUEInformation message to inform a BS 690 of the PC5 RRC connection configuration in step 602. The BS 690 may configure information received from UE #1 600, that is, sidelink radio resources and configuration information required for PC5 RRC connection configuration, based on the PC5 RRC connection configuration notification in step 603. The BS 690 may transmit an RRCReconfiguration message or an RRCConnectionReconfiguration message including the information configured in step 603 to UE #1 600 in step 604. The message in step 604 may include RLC function configuration parameter information required for the PC5 RRC connection. An embodiment of the RLC function configuration parameter information may include Table 6, as shown below.

In step 605, UE #1 600 may determine RLC function configuration parameter information for PC5 RRC connection with UE #2 670 based on the RLC function configuration parameter information received in step 604. UE #1 600 may inform UE #2 670 of the RLC function configuration parameter information. UE #1 600 and UE #670 may perform a PC5 RRC connection configuration procedure based on the RLC function configuration parameter information in step 606. A description of the detailed procedure of the PC5 RRC connection configuration is omitted. When the RLC function configuration parameter information is not received in step 604, UE #1 600 and UE #2 670 may perform the PC5 RRC connection configuration procedure based on RLC function configuration parameter information set in a default configuration. An embodiment of the default configuration is as shown in Table 1, as follows.

TABLE 1

| Name | Value |
|---|---|
| | Signaling SLRB (e.g., SLRB0) |
| PDCP-Config | |
| >t-Reordering | infinity |
| RLC-Config CHOICE | Am |
| SL-RLC-Config | |
| >sn-fieldLength | size 12 |
| >t-PollRetTansmit | ms 45 |
| >poltPDU | infinity |
| >pollByte | infinity |
| >maxRetxThreshold | 18 |
| >t-Reassembly | ms 35 |
| >t-StatusProhibit: | ms 0 |
| logicalChannelIdentity | 1 |
| LogicalChannelConfig | |
| >priority | 1 |
| >prioritisedBitRate | infinity |
| >logicalChannelGroup | 0 |

UE #600 or UE #2 670 may receive an RRCReconfiguration message, an RRCConnectionReconfiguration message, or a V2X SIB including RLC function configuration parameter information for PC5 RRC while transmitting and receiving PC5 RRC connection configuration signaling according to the default configuration or a preset configuration. This procedure may correspond to step 604, and the embodiment of the RLC function configuration parameter information may include Table 6, as shown below.

UE #1 600 and UE #2 670 may transmit and receive PC5 RRC connection configuration signaling according to a new RLC function configuration parameter for PC5 RRC. UE #1 600 and UE #2 670, acquiring the new RLC function configuration parameter for PC5 RRC, may inform the counterpart UE (UE #1 or UE #2) of the new RLC function configuration parameter. PC5 RRC signaling including the new RLC function configuration parameter for PC5 RRC may be transmitted and received through the application of a pre-used RLC function configuration parameter (or default configuration). The new RLC function configuration parameter for PC5 RRC may be applied after PC5 RRC complete signaling corresponding to the PC5 RRC signaling. For example, the PC5 RRC signaling may include AS configuration and AS configuration complete. This procedure may correspond to step 606.

Figure 6B:
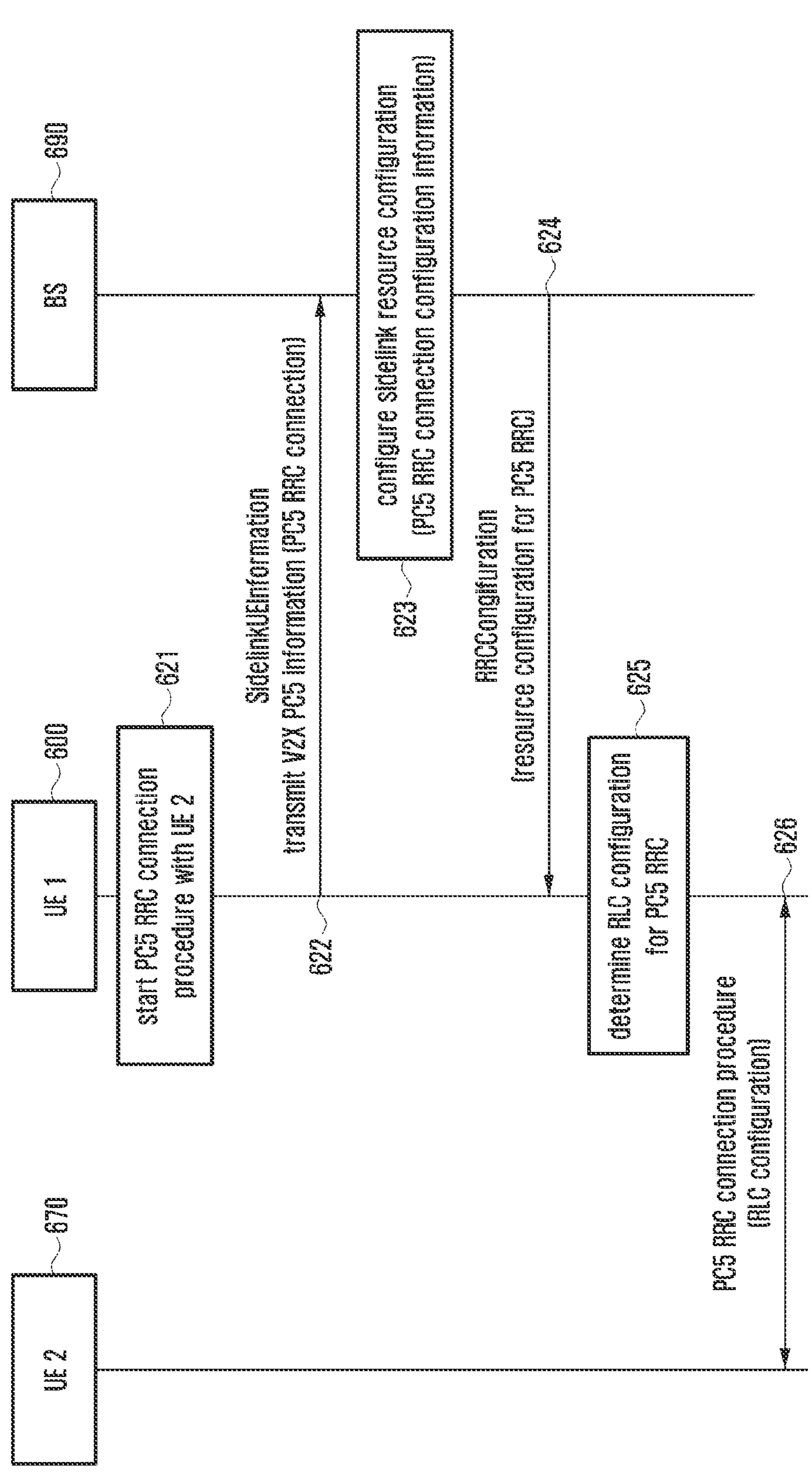
FIG. 6B illustrates a method by which a UE configures an RLC function configuration parameter required for configuring a PC5 RRC connection according to an embodiment.

FIG. 6B illustrates a signal procedure for operating an RLC function configuration parameter to be applied to sidelink RRC according to an embodiment.

FIG. 6B illustrates a method by which the UE configures an RLC function configuration parameter required for configuring a PC5 RRC connection and informing the counterpart UE of the parameter. The UE may indicate the configuration of the RLC function configuration parameter required for configuring the PC5 RRC connection and/or update the parameter to a new value.

Referring to FIG. 6B, UE #1 600 may determine that the PC5 RRC connection for a sidelink unicast connection with UE #2 670 is needed and start a PC5 RRC configuration procedure in step 621. UE #1 600 may transmit a SidelinkUEInformation message to inform a BS 690 of the PC5 RRC connection configuration in step 622. The BS 690 may configure information received from UE #1 600, that is, sidelink radio resources and configuration information required for PC5 RRC connection configuration, based on the PC5 RRC connection configuration notification in step 623. The BS 690 may transmit an RRCReconfiguration message and an RRCConnectionReconfiguration message including the information configured in step 623 to UE #1 600 in step 624. UE #1 600 may determine RLC function configuration parameter information for PC5 RRC with UE #2 670 in step 625 as well as the sidelink radio resources and configuration information received in step 624. UE #1 600 may inform UE #2 670 of the RLC function configuration parameter information.

An embodiment of the RLC function configuration parameter information may include Table 6, as shown below. UE #1 600 and UE #670 may perform a PC5 RRC connection configuration procedure based on the RLC function configuration parameter information for PC5 RRC in step 626. A description of the detailed procedure of the PC5 RRC connection configuration is omitted.

In step 625, UE #1 600 may determine to use the default configuration of Table 1 as the RLC function configuration parameter for PC5 RRC with UE #2 670. At this time, UE #1 600 and UE #2 670 may perform the PC5 RRC connection configuration procedure based on the RLC function configuration parameter information set in the default configuration in Table 1.

Alternatively, UE #1 and UE #2 may determine a change in the RLC function configuration parameter while transmitting and receiving PC5 RRC connection configuration signaling according to the default configuration or a preset configuration, which may correspond to step 625. UE #1 and UE #2 may transfer PC5 RRC signaling including new RLC function configuration parameter information to the counterpart UE, which also includes Table 6. PC5 RRC signaling including the new RLC function configuration parameter for PC5 RRC may be transmitted and received through the application of a pre-used RLC function configuration parameter (or default configuration). The new RLC function configuration parameter for PC5 RRC may be applied after PC5 RRC complete signaling corresponding to the PC5 RRC signaling. For example, the PC5 RRC signaling may include AS configuration and AS configuration complete, which may correspond to step 626.

The RLC function configuration parameter that can be applied to transmission/reception of PC5 signaling (for example, signaling SLRB) may include at least one piece of information in Table 2, Table 3, Table 4, Table 5 and Table 6, as shown below.

TABLE 2

| RLC mode | RLC UM mode | RLC AM mode |
| --- | --- | --- |
| SN size | 6-bit<br>12-bit | 12-bit<br>18-bit |

The RLC function configuration parameter that can be applied to transmission/reception of V2X data (for example, data SLRB) may include at least on piece of information in Table 3, Table 4, Table 5 and Table 6, as shown below.

TABLE 3

| RLC mode | RLC UM mode | RLC AM mode |
| --- | --- | --- |
| SN size | 6-bit<br>12-bit | 12-bit<br>18-bit |
| ARQ<br>parameters | | PollByte value<br>PollPDU value |

The RLC function configuration parameter according to Table 3 above may be applied to each sidelink unicast-based SLRB, each sidelink broadcast-based SLRB, or each sidelink groupcast-based SLRB. The RLC function configuration parameter may be configured by at least one of a method following a UE implementation, a preset method, a method configured by the BS, and a method configured by the UE.

FIG. 7 illustrates a signal procedure for operating an RLC function configuration parameter to be applied to sidelink data according to an embodiment.

Referring to FIG. 7, UE #1 700 may determine sidelink unicast-based V2X data transmission with UE #2 770 in step 701. UE #1 700 may transmit a SidelinkUEInformation message to inform a BS 790 of the sidelink unicast-based V2X data transmission in step 702. The information provided through the SidelinkUEInformation message may include a required data rate.

The information provided through the SidelinkUEInformation message may include at least one of the parameters in Table 4 and Table 5, as shown below, at least one piece of information on unicast, groupcast, and broadcast, and at least one of a destination identifier, a ProSeQos indicator (PQI), a QoS flow identifier (QFI), required reliability information, and required latency information. The BS 790 may configure information received from UE #1 700, that is, sidelink radio resources and configuration information required for sidelink unicast-based data transmission/reception, based on a sidelink unicast-based V2X data transmission notification. The BS 790 may configure the RLC function configuration parameter with reference to at least one of a cast type provided by the UE, the destination identifier, the PQI, the QFI, the required reliability information, the required latency information, and the required data rate. Examples of the RLC function configuration parameter may include at least one of the parameters in Table 3, as shown above and Table 6, as shown below.

The BS 790 may transmit an RRCReconfiguration message or an RRCConnectionReconfiguration message including the information configured in step 703 to UE #1 700 in step 704. The message in step 704 may include RLC function configuration parameter information required for sidelink unicast-based data transmission/reception. In step 705, UE #1 700 may determine RLC function information configuration parameter for sidelink unicast-based data transmission/reception with UE #2 770 based on the RLC function configuration parameter information received in step 704. The RLC function configuration parameter information may include Table 3, Table 4, Table 5 and Table 6, as shown below. UE #1 700 and UE #2 770 may perform the parameter configuration for sidelink unicast data transmission including the RLC function configuration parameter for sidelink unicast-based data transmission/reception in step 706.

The information through which the UE informs the BS of data rate information required for a V2X application, that is, V2X data, to be transmitted/received in sidelink may include at least one piece of information shown in Table 4, as follows.

TABLE 4

```
SL-RLC-TxConfigIndex ::=            SEQUENCE {
dataRateIndex       INTEGER (1..X), // or dataRate      INTEGER (1..Y)
rlcSNSize                   ENUMERATED {6, 12, 15, 18},
pollByte            PollByte,
pollPDU             PollPDU,
...
}
PollPDU ::=         ENUMERATED {
        p4, p8, p16, p32, p64, p128, p256, p512, p1024, p2048, p4096, p6144, p8192,
p12288, p16384, p20480, p24576, p28672, p32768, p40960, p49152, p57344, p65536,
infinity, spare8, spare7, spare6, spare5, spare4, spare3, spare2, spare1}
PollByte ::=        ENUMERATED {
kB1, kB2, kB5, kB8, kB10, kB15, kB25, kB50, kB75, kB100, kB125, kB250,
kB375, kB500, kB750, kB1000, kB1250, kB1500, kB2000, kB3000, kB4000, kB4500,
kB5000, kB5500, kB6000, kB6500, kB7000, kB7500, mB8, mB9, mB10, mB11, mB12,
mB13, mB14, mB15, mB16, mB17, triB18, mB20, inB25, mB30, mB40, infinity,
spare20, spare19, spare18, spare17, spare16, spare15, spare14, spare13, spare12,
spare11, spare10, spare9, spare8, spare7, spare6, spare5, spare4, spare:3, spare2, spare1}
When PollPDU is configured as infinity or PollByte is configured as infinity, poll
is transmitted if there is no more packet in RLC after corresponding packet transmission.
```

In Table 4, data rate information may be indicated by a data rate index or a data rate value.

The data rate value may be the value of a data rate required for each V2X application.

The data rate index may be the index of a data rate required for each V2X application. All available data rates are divided into data rates in predetermined sections in consideration of V2X applications, and an index is designated to each section. The data rate index may be configured as in Table 5, as follows.

TABLE 5

| Data rate index | Data rate demand |
|---|---|
| 1 | Lower than 1 kB |
| 2 | 1 kB to 100 kB |
| 3 | 10 kB to 1000 kB |
| 4 | 1000 kB to 5000 kB |
| . . . | . . . |

The data rate information may be referenced to determine the SN size in Table 3 and/or an ARQ parameter (for example, PollPDU or PollByte) among the RLC function configuration parameters.

The RLC function configuration parameter may include at least one piece of information in Table 6, as shown below.

RX-AM-RLC may correspond to an RLC function configuration parameter to be used by a reception UE in an RLC AM mode, TX-AM-RLC may correspond to a transmit RLC function configuration parameter to be used by a transmission UE in the RLC AM (acknowledged mode), RX-UM-RLC may correspond to a receive RLC function configuration parameter to be used by the reception UE in an RLC UM (unacknowledged mode), and TX-UM-RLC may correspond to an RLC function configuration parameter to be used by the transmission UE in the RLC UM mode.

TABLE 6

```
RX-AM-RLC ::= SEQUENCE {
sn-FieldLength          SN-FieldLengthAM          OPTIONAL,
    t-PollRetransmit      ,
pollPDUPollPDU,
pollBytePollByte,
maxRetxThreshold        ENUMERATED { t1, t2, t3, t4, t6, t8, t16, t32 }
}
TX-AM-RLC ::= SEQUENCE {
sn-FieldLength          SN-fieldLengthAM          OPTIONAL,
```

TABLE 6-continued

```
    t-Reassembly        ,
t-StatusProhibit
}
RX-UM-RLC ::= SEQUENCE {
sn-FieldLength          SN-FieldLengthUM          OPTIONAL,
}
TX-UM-RLC ::= SEQUENCE (
sn-FieldLength SN-FieldLengthUM          OPTIONAL,
    t-Reassembly
}
```

Alternatively, the configured RLC function configuration parameter may be changed, which may be determined by the BS or the UE (UE #1 or UE #2). The RLC function configuration parameter required to be changed may be transferred to the counterpart UE (UE #1 or UE #2).

The BS may manage mapping information between data rate information and information required for configuring the RLC function configuration parameter, such as the SN size in the RLC AM mode, the SN size in the RLC UM mode, and ARQ parameter configuration (for example, PollByte or PollPDU) based on data rate information required by the UE. The mapping information may be provided by a V2X server to the BS.

FIG. 7 illustrates when the UE is in an RRC_Connected state, and an embodiment in which the UE is in an RRC_Idle state or an RRC_Inactive state and/or the UE is out of a coverage area may include at least one of the following cases.

(1) RLC function configuration parameter information may be included in a V2X SIB message transmitted by the BS. The RLC function configuration parameter information included in the V2X SIB message may include at least one of the parameters in Table 7 and Table 8, as shown below. A dataRateIndex included in Table 7 and Table 8 may refer to Table 5.

TABLE 7

```
    SL-RLC-TxConfigListSib   SEQUENCE   (SIZE   (1..max.SL-RLC-TxPreConfig))
OF SL-RLC-TXConfigurationSib
    SL-RLC-TxConfigurationSib ::=   SEQUENCE {
    dataRateIndex   INTEGER (1..X), // or dataRate   INTEGER(1..Y)
    thresDataRate   INTEGER (1..Z),
    rlcSNSize              ENUMERATED {6, 12, 15, 18},
    pollByte          PollByte,
    pollPDU           PollPDU,
    ...
    }
```

TABLE 8

```
    SL-RLC-TxConfigListSib   SEQUENCE   (SIZE   (1..maxSL-RLC-TxPreConfig))
OF SL-RLC-TXConfigurationSib
    SL-RLC-TxConfigurationSib ::=   SEQUENCE {
    dataRateIndex       INTEGER (1..X), // or dataRate   INTEGER (1..Y)
    thresDataRate       INTEGER (1..Z)
    rx-AM-RLC           RX-AM-RLC, // [Table 6]
    tx-AM-RLC           TX-AM-RLC, // [Table 6]
    rx-UM-RLC           RX-UM-RLC, // [Table 6]
    tx-UM-RLC           TX-UM-RLC // [Table 6]
    ...
    }
```

(2) RLC function configuration parameter information may be preconfigured and may include at least one of the parameters in Table 9 and Table 10, as shown below. A dataRateIndex included in Table 9 and Table 10 may refer to Table 5.

TABLE 9

```
    SL-RLC-TxPreConfigList  SEQUENCE  (SIZE  (1..maxSL-RLC-TxPreConfig))
OF SL-RLC-TXPreConfiguration
    SL-RIC-TxPreConfiguration ::=  SEQUENCE {
    dataRateIndex     INTEGER (1..X), // or dataRate  INTEGER (1..Y)
    thresDataRate     INTEGER(1..Z),
    rlcSNSize                 ENUMERATED
    pollByte          PollByte,
    pollPDU           PollPDU,
    ...
    }
```

TABLE 10

```
    SL-RLC-TxPreConfigList  SEQUENCE  (SIZE  (1..maxSL-RLC-TxPreConfig))
OF SL-RLC-TXPreConfiguration
    SL-RLC-TxPreConfiguration ::=     SEQUENCE {
    dataRateIndex     INTEGER (1...X.), // or dataRate     INTEGER (1..Y)
    thresDataRate     INTEGER (1..Z),
    rx-AM-RLC         RX-AM-RLC, // [Table 6]
    tx-AM-RLC         TX-AM-RLC, // [Table 6]
    rx-UM-RLC         RX-UM-RLC, // [Table 6]
    tx-UM-RLC         TX-UM-RLC // [Table 6]
    ...
    }
```

The RRC_Inactive UE or the RRC_Idle UE may receive a V2X SIB message including Table 7 and Table 8 from the BS and acquire RLC function configuration parameter information. The RRC_Inactive UE or the RRC_Idle UE may acquire preconfigured RLC function configuration parameter information of Table 9 and Table 10. The out-of-coverage UE may acquire preconfigured RLC function configuration parameter information of Table 9 and Table 10.

When the dataRateIndex is included in Table 7, Table 8, Table 9 and Table 10, an RLC function configuration parameter of the dataRateIndex corresponding to a required data rate may be applied.

When the dataRate is included in Table 7, Table 8, Table 9 and Table 10, an RLC function configuration parameter of the dataRate corresponding to a required data rate may be applied.

When the thresDataRate is included in Table 7, Table 8, Table 9 and Table 10, the RLC function configuration parameter may be applied only when a required data rate is less than thresDataRate. Alternatively, when thresDataRate is included in Table 7, Table 8, Table 9 and Table 10, the RLC function configuration parameter may be applied only when a required data rate is greater than the thresDataRate.

The RLC function configuration parameter may be configured as a set of parameters as shown in Table 11 below, and parameters included in each set may include at least one of the parameters in Table 6, Table 7, Table 8, Table 9 and Table 10.

TABLE 11

| |
|---|
| RLC function configuration parameter set 1 |
| RLC function configuration parameter set 2 |
| . . . |
| RLC function configuration parameter set N |

When the BS performs a configuration in the UE, an index of an RLC function configuration parameter set may be indicated. When the UE informs the counterpart UE of the RLC function configuration parameter that is preconfigured or is selected by itself, an index of an RLC function configuration parameter set may be indicated. The RLC function configuration parameter set of Table 11 may be indicated and/or configured to be linked with data rate information. For example, an RLC function configuration parameter set corresponding to data rate A may be indicated and/or configured. An RLC function configuration parameter set corresponding to data rate index B may be indicated and/or configured. For example, an RLC function configuration parameter set corresponding to data rate C may be indicated and/or configured.

When RLC function configuration parameter information is configured according to a UE implementation, the UE may manage the information in Table 4 to Table 11 and configure an RLC function configuration parameter, such as the SN size and/or an ARQ parameter, based on data rate information required by V2X data.

When an RLC function configuration parameter for transmitting and receiving sidelink broadcast-based V2X data is configured and/or an RLC function configuration for transmitting and receiving sidelink groupcast-based V2X data is configured, the configuration method through RRC signaling of the BS, the preconfigured method, the configuration method through PC5 signaling of the UE, and the configuration method by the UE implementation may be applied as illustrated in FIG. 7. Table 4 to Table 11 may also be applied.

FIG. 8A illustrates a method of the UE for measuring and reporting congestion of sidelink resources according to an embodiment. In order to determine the state of use of sidelink resources (for example, a sidelink resource congestion state), the BS may make a request for measuring and reporting congestion of a sidelink resource pool to the UE. The UE may be in the RRC_Connected state. The BS may instruct the UE to configure the measurement and report on the congestion through an RRCReconfiguration message or an RRCConnectionReconfiguration message. The configuration of the measurement and report on the congestion may include at least one of an event-based report and a periodic report, as well as at least one piece of sidelink resource pool information to be measured and reported.

When the BS supports configuration and allocation of LTE sidelink resources and/or configuration and allocation of NR sidelink resources, the BS may instruct the UE to measure and report congestion of the LTE sidelink resource pool and/or the NR sidelink resource pool. The BS may instruct the UE to measure and report the congestion of a sidelink resource pool of a secondary RAT. When the UE is instructed to measure and report the congestion of the sidelink resource pool of the secondary RAT, the UE may measure this congestion through a congestion measurement scheme of the secondary RAT and report the congestion according to a configured report scheme. Since an LTE-based channel busy ratio (CBR) measurement and report scheme and an NR-based CBR measurement and report scheme may be defined differently, the UE needs to know indication information indicating whether to follow the LTE scheme or the NR scheme.

Referring to FIG. 8A, the UE may receive configuration of SL measurement and a report on congestion of a sidelink resource pool from the BS in step 801. The UE may determine whether the configuration includes the configuration of measurement and report on congestion of the LTE sidelink resource pool in step 802. When the configuration includes the configuration of measurement and report on congestion of the LTE sidelink resource pool based on the determination in step 802, the UE may measure congestion of the LTE sidelink resource pool and report the congestion according to the report configuration in step 803. A procedure of measuring and reporting congestion of the LTE sidelink resource pool may correspond to a CBR measurement and report procedure defined in LTE-V2X.

The UE may determine whether the configuration in step 801 includes configuration of measurement and report on congestion for the NR sidelink resource pool in step 804. When the configuration is found to include the configuration of measurement and report on congestion for the NR sidelink resource pool based on the determination in step 804, the UE may measure the congestion for the NR sidelink resource pool and report the congestion according to the report configuration in step 805. A procedure of measuring and reporting congestion of the NR sidelink resource pool may correspond to a CBR measurement and report procedure defined in NR-V2X.

The CBR measurement and report procedure defined in NR-V2X may include an operation procedure for determining an NR sidelink frame structure, a resource structure, a reference signal (RS), and congestion of a resource pool, and may be different from the procedure defined in LTE-V2X. When the configuration does not include the configuration of measurement and report on congestion for the LTE sidelink resource pool based on the determination in step 802, the UE may proceed to step 804. When the configuration is found not to include the configuration of measurement and report on congestion for the NR sidelink resource pool based on the determination in step 804, the UE may end the procedure.

Figure 8B:
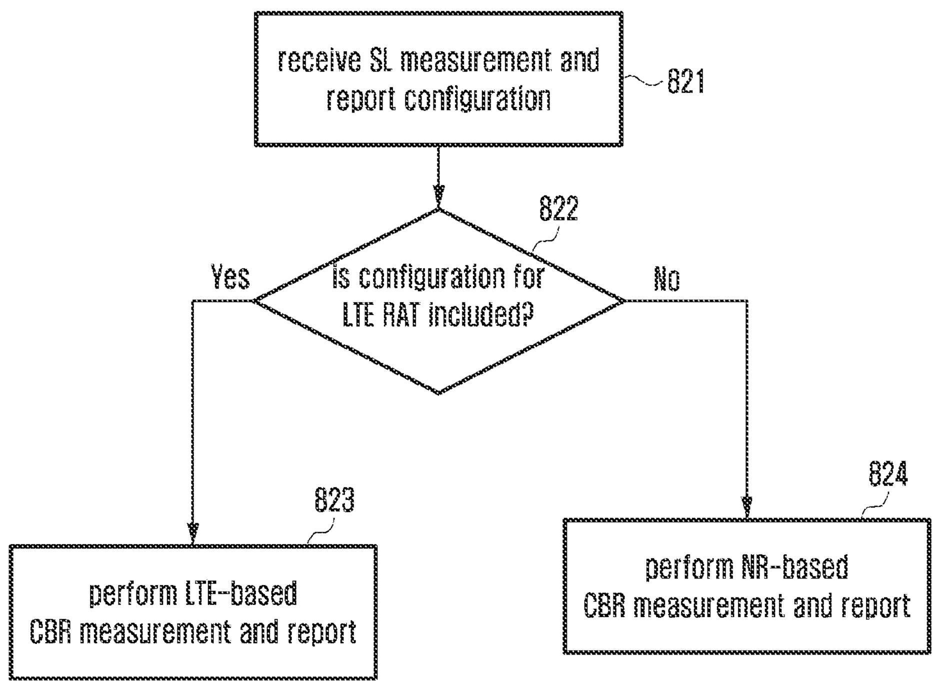
FIG. 8B illustrates a method of a UE for measuring and reporting congestion of sidelink resources according to an embodiment.

FIG. 8B illustrates a method of the UE for measuring and reporting congestion of sidelink resources according to an embodiment.

Referring to FIG. 8B, the UE may receive configuration of SL measurement and report on congestion for a sidelink resource pool from the BS in step 821. The UE may determine whether the configuration includes the configuration of measurement and report on congestion of the LTE sidelink resource pool in step 822. When the configuration includes the configuration of measurement and report on congestion of the LTE sidelink resource pool based on the determination in step 822, the UE may measure congestion of the LTE sidelink resource pool and report the congestion according to the report configuration in step 823. The procedure of measuring and reporting congestion of the LTE sidelink resource pool may correspond to a CBR measurement and report procedure defined in LTE-V2X.

The UE may determine whether the configuration in step 822 includes the configuration of measurement and report on congestion for the NR sidelink resource pool in step 821. When the configuration includes the configuration of measurement and the report on congestion for the NR sidelink resource pool based on the determination in step 822, the UE may measure the congestion for the NR sidelink resource pool and report the congestion according to the report configuration in step 824. The procedure of measuring and reporting congestion of the NR sidelink resource pool may correspond to a CBR measurement and report procedure defined in NR-V2X, which may include an operation procedure for determining an NR sidelink frame structure, a resource structure, a reference signal (RS), and congestion of a resource pool, and may be different from the procedure defined in LTE-V2X.

The information indicating the configuration of measurement and report on congestion for the LTE resource pool and the NR resource pool that the BS transmits to the UE in step 801 and step 821 may include at least one of the parameters in Table 12, Table 13 and Table 14, as shown below.

(1) A sidelink resource pool for which congestion is measured and for which a report may be configured for each of LTE and NR (see Table 12)

(2) A RAT identifier indicating whether a sidelink resource pool for which congestion is measured and for which a report is configured for LTE or NR may be included (see Table 13)

(3) A congestion measurement and report configuration IE may be configured for each of LTE and NR (see Table 14)

The UE may determine LTE configuration or NR configuration according to (1), (2), or (3), and may perform a CBR measurement and report based on LTE for the corresponding sidelink resource pool or perform a CBR measurement and report based on NR for the corresponding sidelink resource pool. Table 12 appears as follows.

TABLE 12

```
//Configuration for LTE sidelink resource pool
tx-ResourcePoolToRemoveList-r14          Tx-ResourcePoolMeasList
    OPTIONAL, -- Need ON
tx-ResourcePoolToAddList-r14          Tx-ResourcePoolMeasList
    OPTIONAL, -- Need ON
//Configuration for NR sidelink resource pool
```

TABLE 12-continued

```
tx-ResourcePoolToRernoveList-r 15        Tx-ResourcePoolMeasList
      OPTIONAL, -- Need ON
tx-ResourcePoolToAddList-rI5           Tx-ResourcePoolMeasList
   OPTIONAL, -- Need ON
Tx-ResourcePoolMeasList ::=           SEQUENCE (SIZE (1..maxSL
PoolToMeasure)) OF SL-V2X-TxPoolReportIdentity
```

As shown in Table 12, configuration for the LTE sidelink resource pool and the NR sidelink resource pool to which the CBR measurement and report are applied may be included. Table 13 appears as follows.

TABLE 13

```
MeasObject ::=   SEQUENCE {
rat-Type         ENUMERATED {LTE, NR},
tx-ResourcePoolToRemoveList   Tx-ResourcePoolMeasList
OPTIONAL,     --Need ON
tx-ResourcePoolToAddList       Tx-ResourcePoolMeasList
OPTIONAL,     --Need ON
...
}
Tx-ResourcePoolMeasList ::=    SEQUENCE   (SIZE   (1..maxSL-
PoolToMeasure)) OF SL-V2X-TxPoolReportIdentity
```

As shown in Table 13, RAT-type information to distinguish the LTE sidelink resource pool and the NR sidelink resource pool to which the CBR measurement and report are applied may be included. Table 14 appears as follows.

TABLE 14

```
MeasObjectEUTRA ::=        SEQUENCE {
tx-ResourcePoolToRemoveList-r14      Tx-ResourcePoolMeasList
OPTIONAL,      --Need ON
tx-ResourcePoolToAddList-r14   Tx-ResourcePoolMeasList
OPTIONAL,      --Need ON
...
}
MeasObjectNR ::=        SEQUENCE {
tx-ResourcePoo1ToRemoveList-r1.5          Tx-ResourcePoolMeas
OPTIONAL,      --Need ON
tx-ResourcePoolToAddList-r15 Tx-ResourcePoolMeasList
OPTIONAL,      --Need ON
```

TABLE 14-continued

```
...
}
Tx-ResourcePoolMeasList ::=   SEQUENCE   (SIZE   (1..maxSL-
PoolToMeasure)) OF SL-472X-TxPoolReportIdentity
```

As shown in Table 14, the CBR measurement report configuration information may include a separate CBR measurement and report configuration IE for each of LTE and NR.

Figure 9:
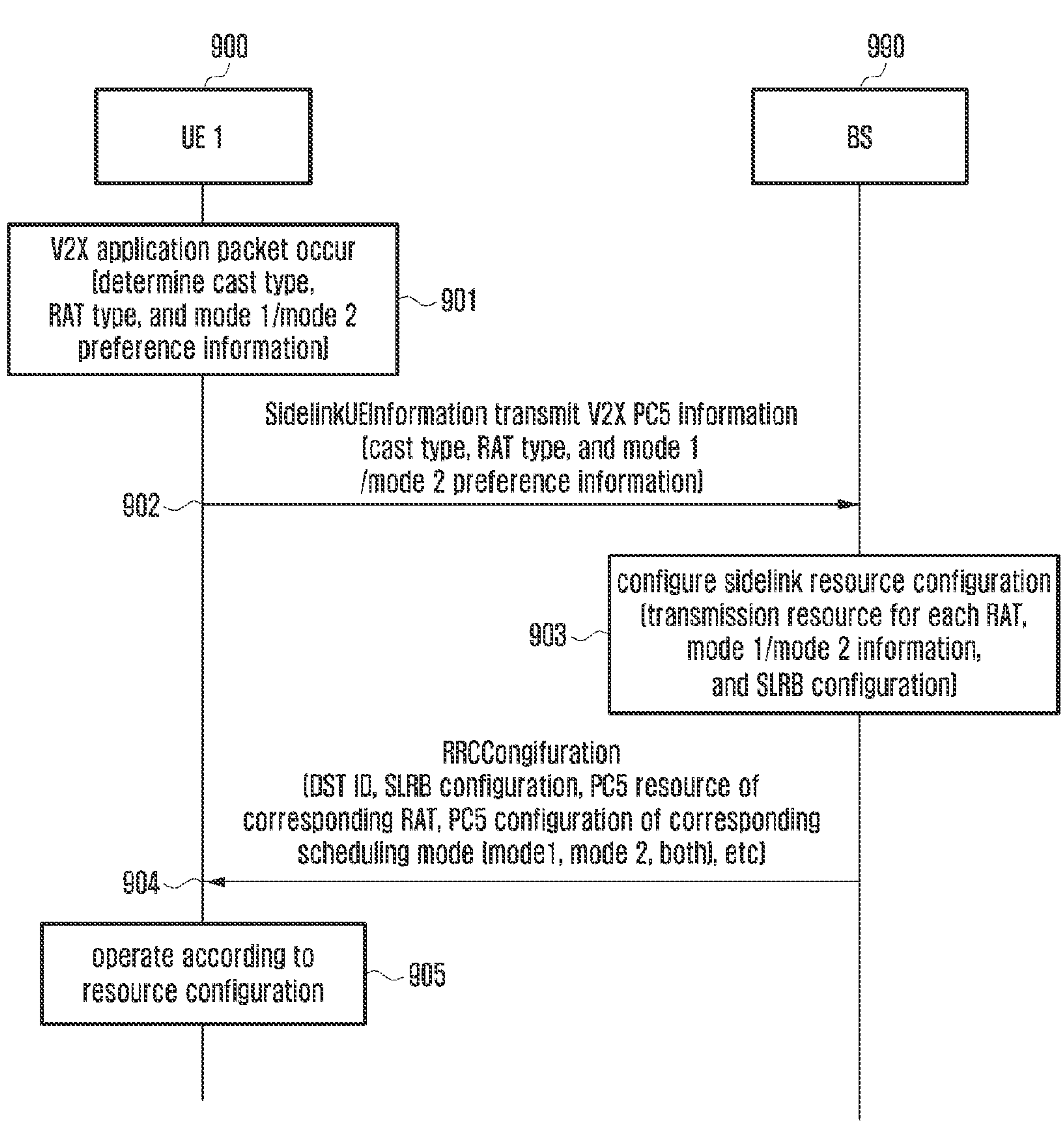
FIG. 9 illustrates a signal procedure for configuring a sidelink resource allocation mode according to an embodiment.

FIG. 9 illustrates a signal procedure for configuring a sidelink resource allocation mode according to an embodiment.

A SidelinkUEInformation message and/or a UEAssistanceInformation message, transmitted when the UE informs the BS of sidelink information, may include at least one of sidelink resource allocation modes in which the UE is interested (BS scheduling mode 1 and UE scheduling mode 2) and sidelink RAT information in which the UE is interested (LTE RAT, NR RAT, LTE & NR RATs).

Table 15, as shown below, illustrates a SidelinkUEInformation message including sidelink resource allocation mode information and sidelink RAT information in which the UE is interested. The sidelink resource allocation mode information and/or the sidelink RAT information in which the UE is interested may also be included in a UEAssistanceInformation message.

TABLE 15

```
SidelinkUEInformation-IEs ::=        SEQUENCE {
   v2x-CommRxInterestedFreqList SL-V2X-CommFreqList
   OPTIONAL,
   px-CommTxType         ENUMERATED {true} OPTIONAL,
   v2x-CommTxResourceReq              SL-V2X-CommTxFreqList
   OPTIONAL,
   ...
}
SL-V2X-CommTxResourceReq ::=           SEQUENCE {
   carrierFreqCommTx      INTEGER (0.. maxFreqV2X-1) OPTIONAL,
   v2x-TypeTxSyne         SL-TypeTxSyne                 OPTIONAL,
   v2x-DestinationInfoListSL-DestinationInfoList   OPTIONAL,
   v2x-CommInterestedMode       ENUMERATED {mode1, mode2, both}
OPTIONAL,
   v2x-CommInterestedRAT        ENUMERATED {NR,   LTE,   both}
OPTIONAL,
   }
   SL-V2X-CommFreqList ::=        SEQUENCE   (SIZE   (1..maxFreqV2X))
OF INTEGER (0..maxFreqV2X-1)
   SL-V2X-CommTxFregList ::=      SEQUENCE   (SIZE   (1..maxFreqV2X))
OF SL-V2X-CommTxResourceReq
   SL-DestinationInfoList ::=     SEQUENCE   (SIZE   (1..maxSL-Dest))
OF SU-DestinationIdentity
   SL-DestinationIdentity ::=     BIT STRING (SIZE (24))
```

The BS receiving the sidelink resource allocation mode information and/or the sidelink RAT information in which the UE is interested may indicate sidelink resource allocation and configuration to the UE through an RRCReconfiguration message or an RRCConnectionReconfiguration message with reference to information of interest to the UE.

Table 16 shows configuration information of the BS including at least one of sidelink resource allocation mode information indicated to the UE (mode 1, mode 2, or mode 1 & mode 2), a destination ID list (unicast, groupcast, and broadcast destination IDs), a cast type indicator that may be included when it is difficult to identify a cast type through only a destination ID, an SLRB ID list (unicast, groupcast, and broadcast SLRB IDs), and an RAT type (LTE RAT, NR RAT, and LTE & NR RAT). Table 16 appears as follows.

TABLE 16

```
SL-V2X-ConfigDedicated ::= SEQUENCE          {
commTxResources CHOICE {
  releaseNULL,
  setup              SEQUENCE {
    scheduled              SEQUENCE {
  s1-V-RNTI              C-RNTI,
  v2x-SchedulingPool     SL-CommResourcePoolV2X       OPTIONAL,      --
Need ON
  mac-MainConfig                    MAC-MainConfigSL,
  mcs                         INTEGER (0..31)         OPTIONAL,      --   Need
OR
  logicalChGroupInfoListLogicalChGroupInfoList,
        rat-Type                        ENUMERATED {LTE, NR, Both},
  ...
    } OPTIONAL,
ue-Selected          SEQUENCE {       -- Pool for normal usage
  v2x-CommTxPoolNormalDedicated          SEQUENCE {
  poolToReleaseList         SL-TxPoolToReleaseListV2X    OPTIONAL,       --
Need ON
  poolToAddModListSL-TxPoolToAddModListV2X OPTIONAL,        --
Need ON
    v2x-CommTxPoolSensingConfig       SL-CommTxPoolSensingConfig
  OPTIONAL, --Need ON
  }
rat-Type                    ENUMERATED {LTE, NR, Both},
...
    } OPTIONAL,
  }
}
```

Referring to FIG. 9, the UE #1 900 may determine whether a packet is generated in a V2X application, and may determine at least one of a cast type, a RAT type, and a sidelink resource allocation mode corresponding to the packet of the V2X application in step 901. The cast type may correspond to unicast, groupcast, or broadcast. The RAT type may correspond to at least one of LTE and NR. The sidelink resource allocation mode may correspond to at least one of mode 1 and mode 2.

The UE #1 900 may inform the BS 990 of at least one of the cast type, the RAT type, and the sidelink resource allocation mode in which the UE is interested, as shown above in Table 15, in step 902. The message that the UE #1 900 transmits to the BS 990 in step 902 may include at least one of a SidelinkUEInformation message or a UEAssistanceInformation message. The BS 990 may configure sidelink resource allocation and configuration information of the UE based on the information in which the UE is interested in step 903.

The BS 990 may transmit the sidelink resource allocation and configuration information to the UE as shown in Table 16, in step 904. The message that the BS 990 transmits to the UE #1 900 in step 904 may include at least one of an RRCReconfiguration message or an RRCConnectionReconfiguration message. The UE #1 900 may perform a V2X packet transmission/reception procedure according to the received configuration information in step 905.

A method of operating SLRB configuration based on PQL, QFI, and QoS requirements of the V2X application will now be described with reference to FIG. 10. When PQIs, QFIs, and QoS requirements are the same or tolerant for V2X packets generated in one or more V2X applications, V2X application packet transmission/reception may be performed in the same SLRB. When PQIs, QFIs, and QoS requirements are different for V2X packets generated in one or more V2X applications, an SLRB corresponding to each PQI or QFI may be configured separately, and V2X application packet transmission/reception may be performed.

Figure 10A:
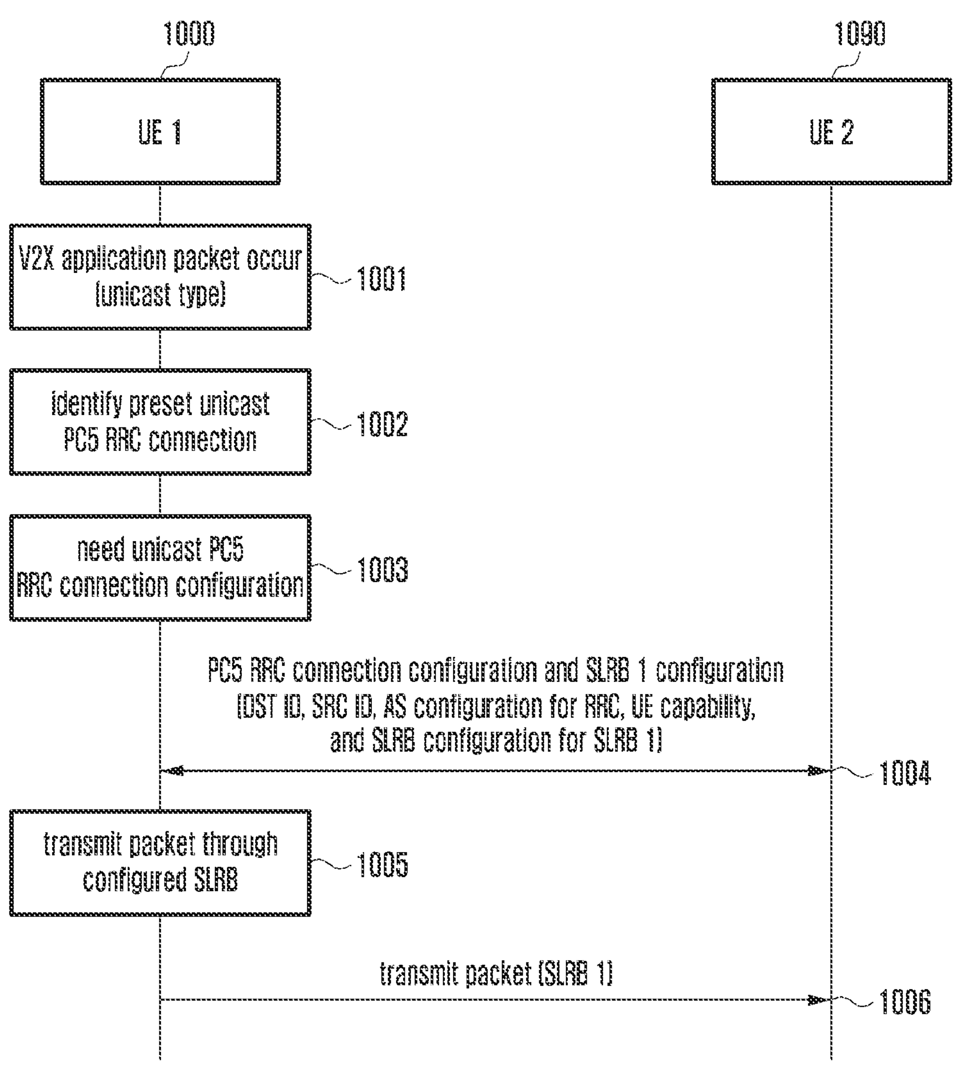
FIG. 10A illustrates the signal flow for configuring a new PC5 RRC unicast connection between UEs according to an embodiment.

FIG. 10A illustrates a signal procedure for operating a sidelink bearer according to an embodiment. FIG. 10A illustrates the signal flow for configuring a new PC5 RRC unicast connection between UEs.

Referring to FIG. 10A, UE #1 1000 may determine the generation of a V2X packet corresponding to a V2X application and determine the cast type of the V2X packet in step 1001. When the cast type of the V2X packet is unicast, UE #1 1000 may identify whether a preset sidelink PC5 RRC configuration can be used in step 1002. When it is determined that a new sidelink PC5 RRC configuration is needed for the V2X packet in step 1003, UE #1 1000 may perform a PC5 RRC connection configuration and SLRB configuration procedure with UE #2 1090 in step 1004. UE #1 1000 may determine to transmit the V2X packet to the configured SLRB in step 1005 and may transmit the V2X packet to UE #2 1090 through the configured SLRB in step 1006.

Figure 10B:
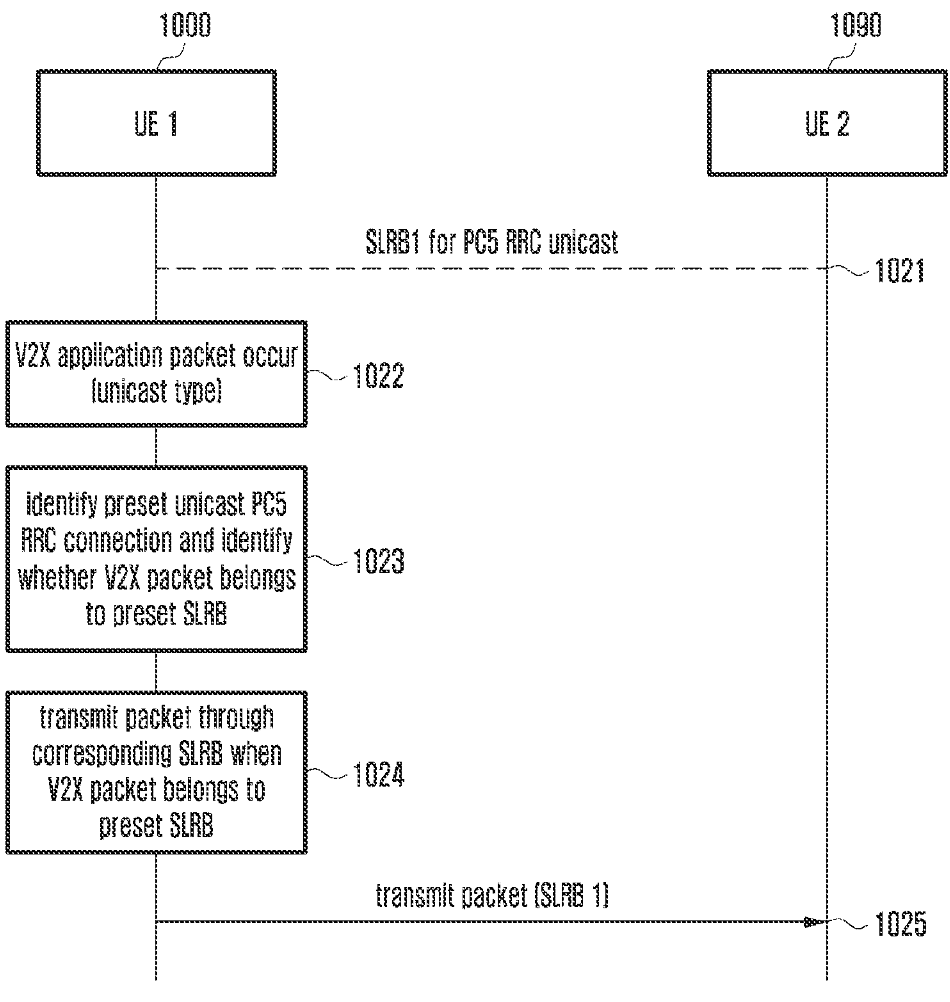
FIG. 10B illustrates the signal flow for transmitting and receiving a V2X packet through preset PC5 RRC unicast connection configuration information according to an embodiment.

FIG. 10B illustrates a signal procedure for operating a sidelink bearer, i.e., the signal flow for transmitting and receiving a V2X packet through preset PC5 RRC unicast connection configuration information when a V2X packet for the same V2X application is generated between UEs, according to an embodiment.

Referring to FIG. 10B, UE #1 1000 and UE #2 1090 may have a PC5 RRC configuration and an SLRB configuration in step 1021. UE #1 1000 may determine the generation of a V2X packet corresponding to a V2X application and determine the cast type of the V2X packet in step 1022. When the cast type of the V2X packet is unicast, UE #1 1000 may determine whether the V2X packet belongs to SLRB of preset sidelink PC5 RRC in step 1023. When it is determined that the V2X packet can be transmitted through the preset SLRB in step 1024, UE #1 1000 may transmit the V2X packet to UE #2 1090 through the configured SLRB in step 1025.

Figure 10C:
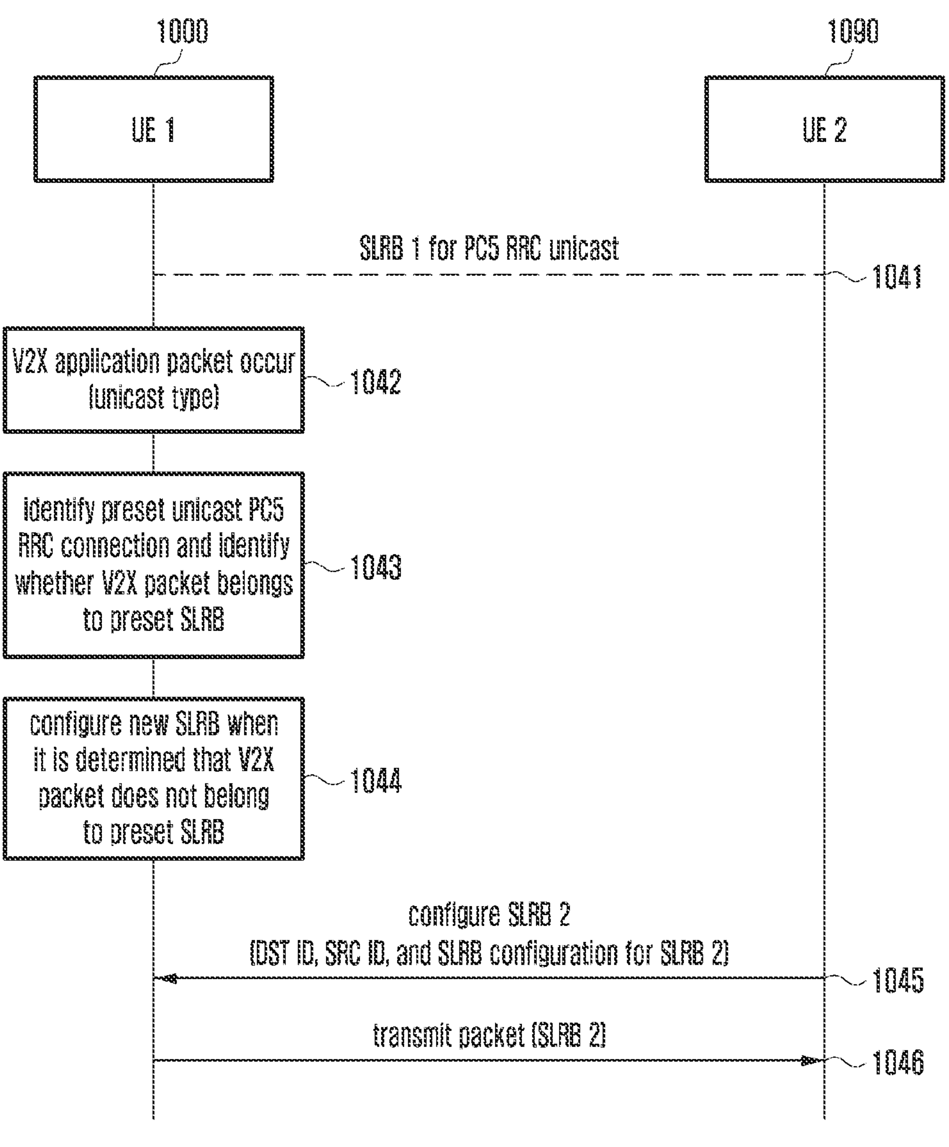
FIG. 10C illustrates the signal flow for configuring a new PC5 unicast-based SLRB according to an embodiment.

FIG. 10C illustrates a signal procedure for operating a sidelink bearer, i.e., illustrates the signal flow for configuring a new PC5 unicast-based SLRB when a V2X packet for a new V2X application is generated between UEs, according to an embodiment.

Referring to FIG. 10C, UE #1 1000 and UE #2 1090 may have a PC5 RRC configuration and an SLRB configuration in step 1041. UE #1 1000 may determine the generation of a V2X packet corresponding to a V2X application and determine the cast type of the V2X packet in step 1042. When the cast type of the V2X packet is unicast, UE #1 1000 may determine whether the V2X packet belongs to SLRB of preset sidelink PC5 RRC in step 1043. When it is determined that the V2X packet cannot be transmitted through the preset SLRB in step 1044, UE #1 1000 may determine the necessity for a new SLRB configuration for transmitting the V2X packet. UE #1 1000 and UE #2 1090 may perform a sidelink PC5 RRC configuration procedure for the new SLRB configuration in step 1045. UE #1 1000 may transmit the V2X packet to UE #2 1090 through the configuration SLRB in step 1046.

Although FIGS. 10A, 10B, and 10C illustrate only the signal flow between two UEs for performing the PC5 RRC connection configuration procedure and the SLRB configuration procedure using the PC5 RRC connection, the signal flow with the BS may be defined when the PC5 RRC connection configuration and SLRB configuration information is received from the BS.

Figure 11A:
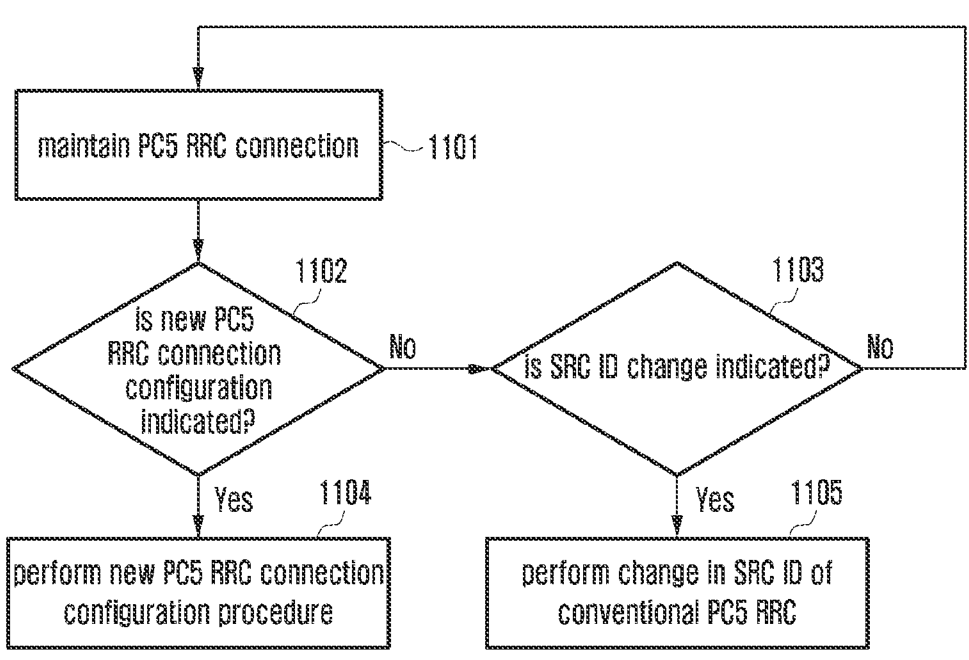
FIG. 11A illustrates a method of a UE for processing a source identifier update for sidelink according to an embodiment.

FIG. 11A illustrates a method of the UE for processing a source identifier update for sidelink according to an embodiment. For example, on the side of peer UEs for performing sidelink unicast, a destination identification (DST ID) and a source identification (SRC ID) may be the same.

SRC ID of UE #1=DST ID of UE #2

SRC ID of UE #2=DST ID of UE #2

A sidelink-based V2X system should be able to change the SRC ID in order to prevent a problem of tracking a source UE. In the case of sidelink unicast, since the SRC ID of the UE may correspond to the DST ID of the peer UE, there may be a problem of changing the DST ID. Since the change in the SRC ID and the change in the DST ID may be interpreted as an indication of a new PC5 RRC connection, two UEs connected through unicast should be able to distinguish when a change in the SRC ID and the DST ID is needed from when a new PC5 RRC connection or a new PC5 SLRB configuration is needed. When the SRC ID and the DST ID are changed, the conventional PC5 RRC connection may be maintained. When the SRC ID and the DST ID are changed, the conventional PC5 SLRB configuration may be maintained.

The UE having the change in the SRC ID may provide notification of the change in the SRC ID from an upper layer of the UE to an RRC layer, and may inform the counterpart UE that the change in the DST ID is needed. The UE requiring the new PC5 RRC connection may provide notification of the necessity for the new PC5 RRC connection from an upper layer of the UE to an RRC layer. The UE may inform the counterpart UE that the new PC5 RRC connection is needed. Alternatively, the UE having the new PC5 SLRB configuration may provide notification of the necessity for the new PC5 SLRB configuration from an upper layer of the UE to an RRC layer. The UE may inform the counterpart UE that the new PC5 configuration is needed. UEs having the sidelink unicast connection may manage SLRB ID, SRC ID, and DST ID mapping information. UEs having the sidelink unicast connection may manage an SLRB ID list mapped to PC5 RRC. UEs having the sidelink unicast connection may manage SRC ID and DST ID information mapped to PC5 RRC.

Referring to FIG. 11A, the UE may determine whether a new PC5 RRC connection configuration is indicated in step 1102 while a PC5 RRC connection is maintained in step 1101. When the new PC5 RRC connection configuration is indicated according to the determination in step 1102, the UE may perform a new PC5 RRC connection configuration procedure in step 1104. When a change in an SRC ID (source ID) is indicated according to the determination in step 1103, the UE may perform an SRC ID change procedure that is being used for the conventional PC5 RRC connection in step 1105. Step 1102 and step 1103 may pertain to information indicated from an upper layer of one UE to an RRC layer and may be indicated through a PC5 RRC connection between two UEs.

Figure 11B:
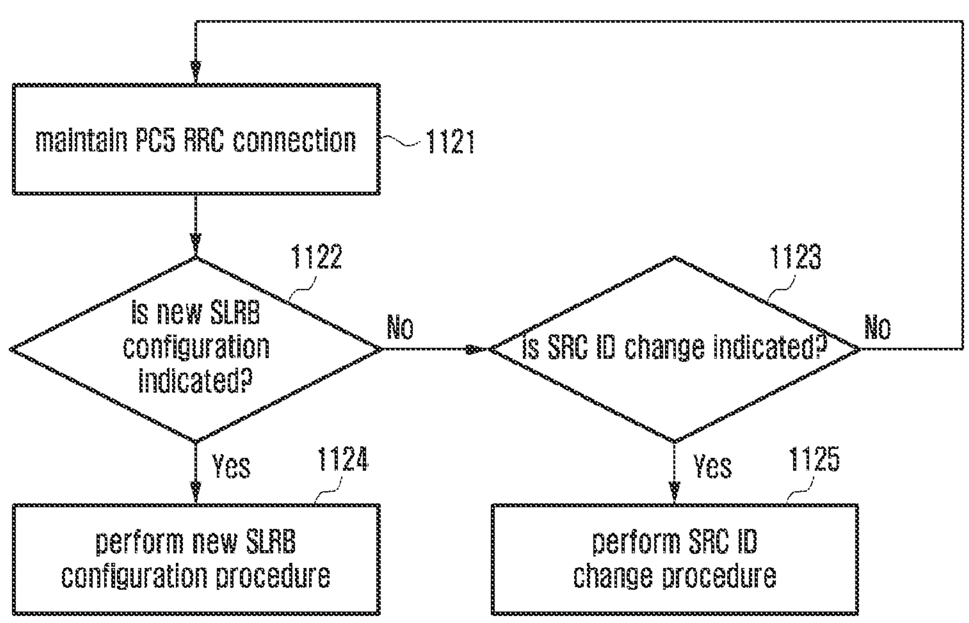
FIG. 11B illustrates a method of a UE for processing a source identifier update for sidelink according to an embodiment.

FIG. 11B illustrates a method of the UE for processing a source identifier update for sidelink according to an embodiment.

Referring to FIG. 11B, the UE may determine whether a new PC5 SLRB configuration is indicated in step 1122 while a PC5 RRC connection is maintained in step 1121. When the new SLRB configuration is indicated according to the determination in step 1122, the UE may perform a new SLRB configuration procedure in step 1124. When a change in an SRC ID is indicated according to the determination in step 1123, the UE may perform an SRC ID change procedure for the conventional SLRB in step 1125. When a change in an SRC ID is not indicated according to the determination in step 1123, step 1121 is repeated. Step 1122 and step 1123 may correspond to an internal procedure of one UE, which is a new SLRB configuration indication and an SRC ID change indication from an upper layer to an RRC layer, and may be a new SLRB configuration indication and an SRC ID change indication as a configuration through the PC5 RRC connection between two UEs connected through PC5 RRC unicast.

FIGS. 11A and 11B may be performed by two UEs connected through sidelink unicast.

Figure 12:
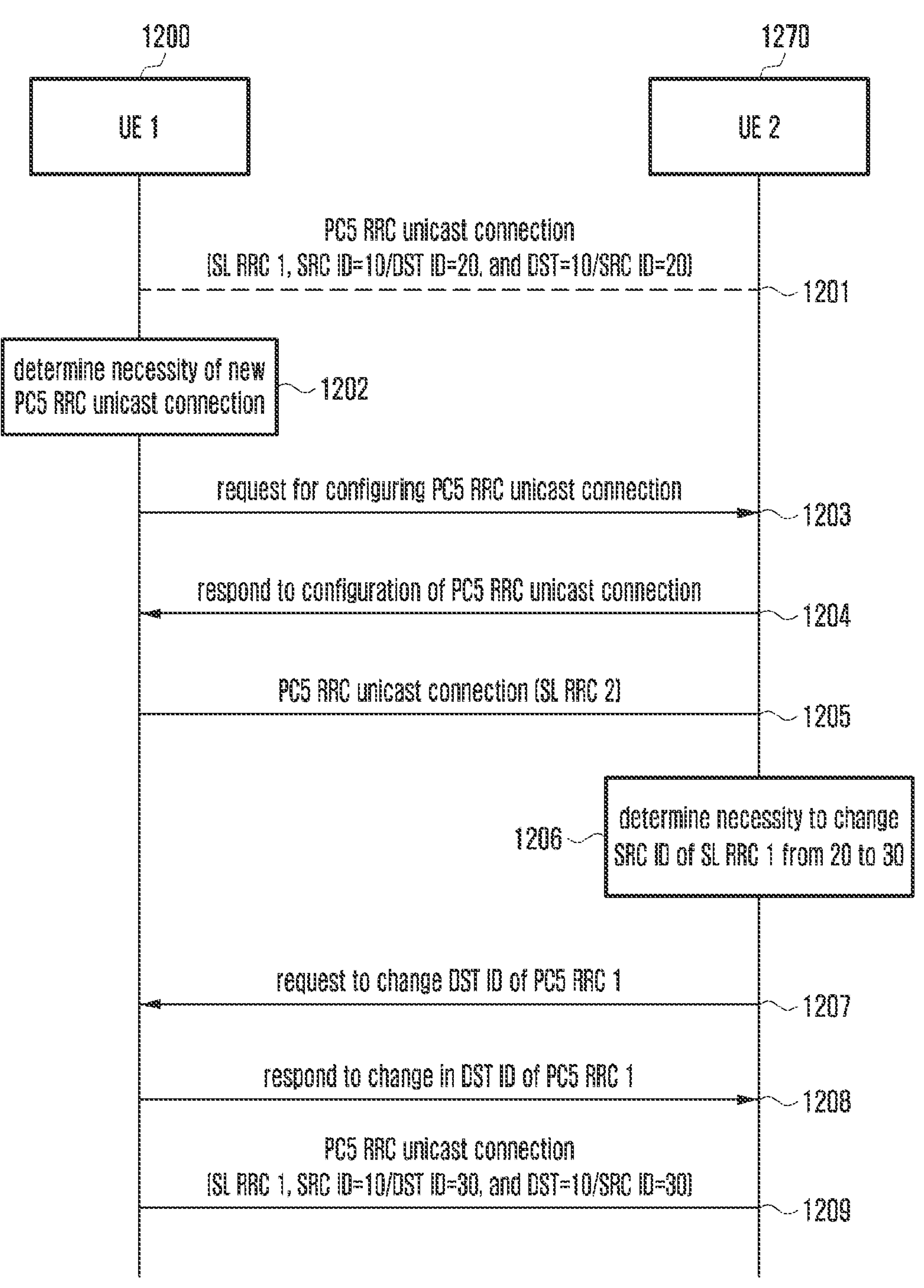
FIG. 12 illustrates a signal procedure for processing a source identifier update for sidelink according to an embodiment.

FIG. 12 illustrates a signal procedure for processing a source identifier update for sidelink according to an embodiment.

Referring to FIG. 12, UE #1 1200 and UE #2 1270 may have a PC5 RRC unicast connection in step 1201. SLRB configured through the PC5 RRC unicast connection may correspond to SLRB=1. SRC ID=10 and DST ID=20 on the side of UE #1 1200, and SRC ID=20 and DST ID=10 on the side of UE #2 1270. UE #1 1200 may determine the necessity for a new PC5 RRC unicast connection or the necessity for a new SLRB configuration in step 1202. UE #1 1200 and UE #2 1270 may perform the PC5 RRC unicast connection configuration and the new SLRB configuration in step 1203 and step 1204. UE #1 1200 and UE #2 1270 may have SLRB 2 in step 1205 through the procedures in step 1203 and 1204.

In step 1206, UE #2 1270 may determine the necessity for a change in its own SRC ID for SLRB 1, which is the DST ID of UE #1 1200. UE #2 1270 and UE #1 1200 may perform a procedure for changing a DST ID of UE 1 (that is, an SRC ID of UE #2) for SLRB 1 in step 1207 and step 1208. After step 1207 and step 1208, UE #1 1200 and UE #2 1270 may configure SRC ID=10 and DST ID=30 on the side of UE #1 and configure SRC ID=30 and DST ID=10 on the side of UE #2 in accordance with SLRB 1 in step 1209.

A method of operating a sidelink logical channel priority (LCP) may include at least one of the following methods.

Method 1: Priority information of a sidelink logical channel corresponding to a V2X packet or V2X flow may use a default priority level value of 5 QIs of the V2X packet or V2X flow. Examples of 5 QIs are shown in Table 17 below. A PQI which can be applied to V2X sidelink may be derived based on the 5 QIs, and the priority of the PQI may be configured to follow the default priority level value. Alternatively, the priority of the PQI may be configured based on the default priority level value.

An AS layer of the UE may determine the priority value of a logical channel corresponding to the V2X flow or V2X packet according to the priority level of the PQI of the V2X flow or V2X packet and execute the LCP according to the priority. For example, it is assumed that the priority is lower as the priority value is higher. A logical channel corresponding to V2X flow or a V2X packet having a high priority (having a low priority value) may be preferentially scheduled. PC5 RRC may have a higher priority than the V2X packet. Table 17 appears as follows.

TABLE 17

| 5QI value | Resource Type | Default Priority Level | Packet Delay Budget | Packet Error Rate | Default Maximum Data Burst Volume | Default Averaging Window | Example Services |
|---|---|---|---|---|---|---|---|
| 82 | Delay Critical GBR | 19 | 10 ms | $10^{-4}$ | 255 bytes | 2000 ms | Discrete Automation (see TS 22.261 [22]) |
| 83 | | 22 | 10 ms | $10^{-4}$ | 1354 bytes (NOTE 3) | 2000 ms | Discrete Automation (see TS 22.261 [22]), eV2X Messages (Platooning, Cooperative Lane Change with low LoA; see TS 22.186 [4]) |
| 84 | | 24 | 30 ms | $10^{-5}$ | 1354 bytes | 2000 ms | Intelligent transport systems (see |
| 85 | | 21 | 5 ms | $10^{-5}$ | 255 bytes | 2000 ms | Electricity Distribution-high voltage (see TS 22.261 [22]), Remote Driving (see TS 22.186 [4]) |
| 100 | | 18 | 5 ms | $10^{-4}$ | 1354 bytes | 2000 ms | eV2X messages (Collision Avoidance, Platooning with high LoA (see TS 22.186 [4]) |

Method 2: V2X layer may configure a priority value which can be applied to a V2X packet or V2X flow. The operation of the priority value assigned to the V2X packet or V2X flow may follow the rule of an upper layer. An AS layer of the UE may determine the priority of a logical channel corresponding to the V2X flow or V2X packet based on a priority value of the V2X flow or V2X packet, and may execute the LCP according to the priority.

For example, it is assumed that the priority is lower as the priority value is higher. A logical channel corresponding to V2X flow or a V2X packet having a high priority (having a low priority value) may be preferentially scheduled. PC5 RRC may have a higher priority than the V2X packet.

A method of selecting sidelink resource pools to be used for the direct link setup between UEs of a higher layer and/or PC5 RRC connection setup between UEs may include at least one of the following methods.

(1) Use broadcast pool until PC5 RRC connection establishment completed, and then use unicast pool for V2X data traffic.

(2) Use unicast pool for the whole direct link setup procedures including PC5 RRC connection establishment.

(3) Use broadcast pool before PC5 RRC connection establishment signaling.

(4) Use broadcast pool before PC5 RRC connection establishment signaling which requires HARQ feedback.

Methods disclosed according to embodiments described herein may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to embodiments of the disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of these memories may form a memory in which the program is stored. A plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. A separate storage device on the communication network may access a portable electronic device.

While the disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by a user equipment (UE) in a wireless communication system, the method comprising:

receiving, from a base station associated with a long term evolution (LTE), a radio resource control (RRC) message including a configuration for a new radio (NR) sidelink communication, wherein the configuration includes a measurement object including a list of transmission resource pools for a channel busy ratio (CBR) measurement for the NR sidelink communication;

performing the CBR measurement for the NR sidelink communication based on the measurement object included in the configuration received from the base station associated with the LTE; and transmitting, to the base station associated with the LTE, a measurement report including the CBR measurement for the NR sidelink communication.

2. A method performed by a base station associated with a long term evolution (LTE) in a wireless communication system, the method comprising:

transmitting, to a user equipment (UE), a radio resource control (RRC) message including a configuration for a new radio (NR) sidelink communication, wherein the configuration is associated with a measurement object including a list of transmission resource pools for a channel busy ratio (CBR) measurement for the NR sidelink communication; and receiving, from the UE, a measurement report including the CBR measurement for the NR sidelink communication, wherein the CBR measurement for the NR sidelink communication is performed based on the measurement object included in the configuration received from the base station associated with the LTE.

3. A user equipment (UE) in a wireless communication system, comprising:

a transceiver; and a controller configured to:

receive, from a base station associated with a long term evolution (LTE), a radio resource control (RRC) message including a configuration for a new radio (NR) sidelink communication, wherein the configuration includes a measurement object including a list of transmission resource pools for a channel busy ratio (CBR) measurement for the NR sidelink communication, perform the CBR measurement for the NR sidelink communication based on the measurement object included in the configuration received from the base station associated with the LTE, and transmit, to the base station associated with the LTE, a measurement report including the CBR measurement for the NR sidelink communication.

4. A base station associated with a long term evolution (LTE) in a wireless communication system, comprising:

a transceiver; and a controller configured to:

transmit, to a user equipment (UE), a radio resource control (RRC) message including a configuration for a new radio (NR) sidelink communication, wherein the configuration is associated with a measurement object including a list of transmission resource pools for a channel busy ratio (CBR) measurement for the NR sidelink communication, and receive, from the UE, a measurement report including the CBR measurement for the NR sidelink communication, wherein the CBR measurement for the NR sidelink communication is performed based on the measurement object included in the configuration received from the base station associated with the LTE.

* * * * *